US008487573B2

(12) United States Patent
Nakamura

(10) Patent No.: US 8,487,573 B2
(45) Date of Patent: Jul. 16, 2013

(54) STARTER CONTROLLER

(75) Inventor: Ryouta Nakamura, Handa (JP)

(73) Assignee: Denso Corporation, Kariya (JP)

( * ) Notice: Subject to any disclaimer, the term of this patent is extended or adjusted under 35 U.S.C. 154(b) by 215 days.

(21) Appl. No.: 13/197,160

(22) Filed: Aug. 3, 2011

(65) Prior Publication Data

US 2012/0032453 A1 Feb. 9, 2012

(30) Foreign Application Priority Data

Aug. 4, 2010 (JP) ................................ 2010-175619

(51) Int. Cl.
*H02K 23/00* (2006.01)

(52) U.S. Cl.
USPC ........... 318/437; 318/430; 318/432; 318/778; 307/9.1; 307/10.7; 290/38 R; 290/40 C

(58) Field of Classification Search
USPC ................... 318/430, 432, 437, 778; 307/9.1, 307/10.7; 701/29, 113; 290/38 R, 40 C
See application file for complete search history.

(56) References Cited

U.S. PATENT DOCUMENTS 5,844,325 A * 12/1998 Waugh et al. ................ 307/10.7
7,023,102 B2 * 4/2006 Itoh ............................ 290/40 C
7,105,937 B2 * 9/2006 Hoppe et al. ................ 290/38 R
7,218,118 B1 * 5/2007 Gonring ........................ 324/429
7,755,314 B2 * 7/2010 Atarashi et al. ............... 318/437
7,847,434 B2 * 12/2010 Wakitani et al. ................ 307/65
8,190,350 B2 * 5/2012 Kortschak et al. ............ 701/113
8,384,237 B2 * 2/2013 Nefcy et al. .................... 307/9.1
2004/0168664 A1 9/2004 Senda et al.
2004/0174018 A1 * 9/2004 Itoh ............................ 290/40 C
2009/0001914 A1 * 1/2009 Atarashi et al. ............... 318/437
2009/0024265 A1 * 1/2009 Kortschak et al. .............. 701/22
2010/0271006 A1 * 10/2010 Fortner ......................... 324/126
2011/0196570 A1 * 8/2011 Nakamura ...................... 701/29

FOREIGN PATENT DOCUMENTS

EP 2128426 12/2009
EP 2233733 9/2010
JP 9-291873 11/1997
JP 10-184507 7/1998
JP 11-30139 2/1999
JP 2006-29142 2/2006
JP 2006-322332 11/2006

OTHER PUBLICATIONS

U.S. Appl. No. 13/023,711, filed Feb. 19, 2011, Ryouta Nakamura.
Japanese Official Action dated Nov. 20, 2012 issued in corresponding Japanese Application No. 2010-175619, with English translation.

* cited by examiner

*Primary Examiner* — Paul Ip
(74) *Attorney, Agent, or Firm* — Nixon & Vanderhye PC

(57) ABSTRACT

A relay is provided in a power supply line from a battery to a motor of a starter in a vehicle. The relay is selectively switched between a contact side state where contacts short-circuit and a resistor side state where the contacts open and a resistor is inserted into the power supply line in series. When an engine is started, an ECU controlling the starter energizes the motor by driving the relay to the resistor side only for a first predetermined time in order to suppress inrush current and voltage fall due to the inrush current. The ECU detects a contact side state fixation abnormality of the relay based on a battery voltage at the time when the motor is energized by driving the relay to the resistor side.

29 Claims, 16 Drawing Sheets

STARTER CONTROLLER

CROSS REFERENCE TO RELATED APPLICATION

This application is based on and incorporates herein by reference Japanese Patent Application No. 2010-175619 filed on Aug. 4, 2010.

BACKGROUND OF THE INVENTION

1. Field of the Invention

The present invention relates to a controller of a starter that cranks an engine of a vehicle to start the engine.

2. Description of Related Art

A technology for controlling energization to a motor of a starter (starter motor) that cranks an engine is described in Patent document 1 (JP-A-2004-308645), for example. In Patent document 1, a parallel circuit of a resistor (starting resistor) for suppressing inrush current and a short-circuit relay for bypassing the resistor by short-circuiting its contacts (i.e., by switching on) is provided in an energization route from a battery as a power supply to the starter motor. When the energization to the starter motor is started, following control is performed. That is, current suppressed by the resistor is passed to the starter motor by opening the contacts of the short-circuit relay. Thereafter, the resistor is made ineffective by closing the contacts of the short-circuit relay to apply the entire voltage of the battery to the starter motor. With such the control, the inrush current during the start of the energization to the starter motor is suppressed and fall of the battery voltage (power supply voltage) is suppressed.

Patent document 2 (JP-A-H11-30139) describes a starter constructed to be switchable between a state where a pinion gear rotated by a motor is engaged with a ring gear of an engine and a state where the pinion gear is disengaged from the ring gear independently from energization to the motor.

If a fixation abnormality occurs in the short-circuit relay and a state where the contacts of the short-circuit relay remain closed is caused in the technology of Patent document 1, the resistor cannot be effected during the start of the engine, so the fall of the battery voltage cannot be suppressed.

If the battery voltage falls largely in each engine start, charge of the battery is necessitated after the completion of the engine start. As a result, charge and discharge of the battery is performed frequently.

Such the frequent charge and discharge of the battery leads to exhaustion of the battery (performance degradation). If an alternator is rotated to charge the battery, torque to be generated by the engine increases, and eventually a fuel consumption deteriorates.

If a state where the short-circuit relay remains open is caused, the resistor remains in the energization route to the starter motor. An electricity consumption and heat generation in the resistor during the energization to the starter motor (during engine start) increase significantly. If the resistor is cut by the heat generation, the energization to the starter motor cannot be performed and the engine cannot be started thereafter.

Therefore, it is desirable to detect occurrence of an uncontrollable abnormality in a section for suppressing the inrush current to the starter motor such as the above-mentioned resistor or the short-circuit relay and to perform some treatment.

SUMMARY OF THE INVENTION

It is an object of the present invention to enable detection of occurrence of an uncontrollable abnormality in an inrush current suppressing section for suppressing inrush current to a starter motor.

According to a first example aspect of the present invention, a starter controller is used for a vehicle having a starter that cranks an engine of the vehicle by torque of a motor, a switching section and an inrush current suppressing section.

The switching section is provided in a power supply line from a power supply to the motor of the starter (starter motor) and is selectively driven between an on-state for connecting the power supply line and an off-state for disconnecting the power supply line. The inrush current suppressing section is provided in series with the switching section in the power supply line and is driven between a first state for suppressing a current passed to the motor and a second state for not suppressing the current passed to the motor when the switching section is driven to the on-state.

If the switching section is in the off-state, the current does not flow to the starter motor. If the switching section is driven to the on-state and the inrush current suppressing section is driven to the first state, the current suppressed by the inrush current suppressing section flows from the power supply to the starter motor. If the switching section is driven to the on-state and the inrush current suppressing section is driven to the second state, the current not suppressed by the inrush current suppressing section flows from the power supply to the starter motor.

The starter controller has a start energization processing section for performing start energization processing for driving the inrush current suppressing section to the first state, for driving the switching section to the on-state, and for driving the inrush current suppressing section from the first state to the second state after elapse of a predetermined time as energization processing for energizing the starter motor such that the starter cranks the engine when the engine is started in response to starting operation by a driver of the vehicle (e.g., operation for twisting key or pushing start switch). With such the processing, the current to the starter motor is suppressed with the inrush current suppressing section for a predetermined time after the energization start. As a result, the inrush current is suppressed, and a large fall of the power supply voltage can be prevented. The inrush current to the starter motor is suppressed when the engine is cranked. Accordingly, shock between a pinion gear of the starter and a ring gear of the engine can be reduced, so durability quality of the pinion and the ring gear can be improved.

The starter controller has an abnormality detecting section for detecting whether an uncontrollable abnormality has occurred in the inrush current suppressing section based on a voltage of the power supply line at the time when the switching section is driven to the on-state.

If the switching section is in the on-state, the current flowing from the power supply to the starter motor takes different values according to the state of the inrush current suppressing section. If the current flowing to the starter motor differs, a change arises in the voltage of the power supply line. There is a correlation between the voltage of the power supply line and the state of the inrush current suppressing section. Therefore, if the voltage of the power supply line in the case where the switching section is driven to the on-state and the driven state of the inrush current suppressing section do not match, the abnormality detecting section can determine that the driven state of the inrush current suppressing section and the actual state are different from each other and an uncontrollable abnormality has occurred in the inrush current suppressing section.

Therefore, the starter controller having such the abnormality detecting section can detect the occurrence of the uncontrollable abnormality in the inrush current suppressing section.

According to a second example aspect of the present invention, the inrush current suppressing section is selectively driven between the first state where a resistor is inserted into the power supply line in series and the second state where the resistor is not inserted into the power supply line. If the switching section is driven to the on-state when such the inrush current suppressing section having the resistor is used, the current flows to the starter motor irrespective of the state of the inrush current suppressing section. If the inrush current suppressing section is in the first state, the current flows from the power supply to the starter motor through the resistor. If the inrush current suppressing section is in the second state, the current flows from the power supply to the starter motor without passing through the resistor.

When such the inrush current suppressing section having the resistor is used, according to a third example aspect of the present invention, the abnormality detecting section detects whether a fixation abnormality, in which the inrush current suppressing section cannot switch the state, has occurred in the inrush current suppressing section based on an output voltage of the power supply at the time when the switching section is driven to the on-state, i.e., the output voltage of the power supply during the energization to the starter motor.

The detection principle is as follows. Energization current in the case where the starter motor is energized while the inrush current suppressing section is driven to the first state may be denoted with IM1. Energization current in the case where the starter motor is energized while the inrush current suppressing section is driven to the second state may be denoted with IM2. In this case, IM1 is smaller than IM2. It is because the resistor is inserted in the power supply line in the former case and the energization current to the starter motor decreases by an amount corresponding to the resistor.

There is an impedance (internal impedance) inside the power supply. Therefore, an output voltage V1 of the power supply in the case where the starter motor is energized while driving the inrush current suppressing section to the first state and an output voltage V2 of the power supply in the case where the starter motor is energized while driving the inrush current suppressing section to the second state take different values. In a normal case, V1 is higher than V2. It is because IM1<IM2 and a voltage drop inside the power supply becomes smaller in the former case than in the latter case.

A normal value, which V1 should originally take, may be denoted with Vs1 and a normal value, which V2 should originally take, may be denoted with Vs2. In this case, if V1 is lower than a predetermined value between Vs1 and Vs2, it can be determined that the inrush current suppressing section is not in the first state, which is intended to be set originally, but is actually in the second state, i.e., the fixation abnormality, in which the inrush current suppressing section remains in the second state, has occurred. If V1 does not become lower than a predetermined value between Vs1 and Vs2, it can be determined that the inrush current suppressing section is not in the second state, which is intended to be set originally, but is actually in the first state, i.e., the fixation abnormality, in which the inrush current suppressing section remains in the first state, has occurred. The normal value Vs1 is the output voltage of the power supply in the case where the starter motor is energized when the inrush current suppressing section is in the first state. The normal value Vs2 is the output voltage of the power supply in the case where the starter motor is energized when the inrush current suppressing section is in the second state.

According to a fourth example aspect of the present invention, the abnormality detecting section determines whether the output voltage of the power supply becomes lower than a predetermined determination value of second state fixation when the inrush current suppressing section is driven to the first state and the switching section is driven to the on-state. The abnormality detecting section determines that a fixation abnormality (referred to also as second state fixation abnormality, hereafter), in which the inrush current suppressing section remains in the second state, has occurred in the inrush current suppressing section if the output voltage of the power supply becomes lower than the determination value of second state fixation.

According to an eighth example aspect of the present invention, the abnormality detecting section determines whether the output voltage of the power supply becomes lower than a predetermined determination value of first state fixation when the inrush current suppressing section is driven to the second state and the switching section is driven to the on-state. The abnormality detecting section determines that a fixation abnormality (referred to also as first state fixation abnormality), in which the inrush current suppressing section remains in the first state, has occurred in the inrush current suppressing section if the output voltage does not become lower than the determination value of first state fixation.

The determination value of second state fixation and the determination value of first state fixation can be set voltage values between Vs1 and Vs2 respectively. The determination value of second state fixation and the determination value of first state fixation may be the same value or different values.

According to a fifth example aspect of the present invention, in the starter controller according to the fourth example aspect of the present invention, the starter has a pinion gear that is rotated by the motor and that cranks the engine when the pinion gear is rotated in a state where the pinion gear is engaged with a ring gear of the engine. The starter is constructed to be switchable between a state where the pinion gear is engaged with the ring gear and a state where the pinion gear is disengaged from the ring gear regardless of whether the motor is energized or not.

The abnormality detecting section performs second state fixation abnormality detection processing at non-start timing as processing for detecting whether the fixation abnormality, in which the inrush current suppressing section remains in the second state, has occurred in the inrush current suppressing section during operation of the engine.

In the second state fixation abnormality detection processing at non-start timing, the pinion gear is disengaged from the ring gear, the inrush current suppressing section is driven to the first state, the switching section is driven to the on-state, it is determined whether the output voltage of the power supply at that time becomes lower than a first determination value of second state fixation, and it is determined that the fixation abnormality, in which the inrush current suppressing section remains in the second state, has occurred in the inrush current suppressing section if the output voltage becomes lower than the first determination value of second state fixation.

In short, in the second state fixation abnormality detection processing at non-start timing, during the operation of the engine in which the cranking is unnecessary, energization of the starter motor is tried while disengaging the pinion gear of the starter from the ring gear of the engine. Thus, it is determined whether the second state fixation abnormality has occurred in the inrush current suppressing section without causing the starter to crank the engine.

With such the construction, the occurrence of the second state fixation abnormality in the inrush current suppressing section can be detected before the engine start. When the starter motor is energized by the start energization processing in the starter controller according to the fifth example aspect of the present invention, the pinion gear may be engaged with the ring gear and the starter may be caused to crank the engine.

According to a sixth example aspect of the present invention, in the starter controller according to the fourth or fifth example aspect of the present invention, the abnormality detecting section performs second state fixation abnormality detection processing at start timing as processing for detecting whether the fixation abnormality, in which the inrush current suppressing section remains in the second state, has occurred in the inrush current suppressing section when the starter controller performs the start energization processing to drive the inrush current suppressing section to the first state and to drive the switching section to the on-state. In the second state fixation abnormality detection processing at start timing, it is determined whether the output voltage of the power supply becomes lower than a second determination value of second state fixation. It is determined that the fixation abnormality, in which the inrush current suppressing section remains in the second state, has occurred in the inrush current suppressing section if the output voltage becomes lower than the second determination value of second state fixation.

In short, in the second state fixation abnormality detection processing at start timing, it is determined whether the second state fixation abnormality has occurred in the inrush current suppressing section by using the start energization processing performed to start the engine. This scheme provides an advantage that there is no need to drive the inrush current suppressing section and the switching section only for the abnormality detection.

The second determination value of second state fixation may be the same value as or a different value from the first determination value of second state fixation.

According to a seventh example aspect of the present invention, the starter controller according to any one of fourth to sixth example aspects of the present invention further has a first informing section. The first informing section informs the vehicle driver of the occurrence of the fixation abnormality, in which the inrush current suppressing section remains in the second state, when the abnormality detecting section determines that the fixation abnormality, in which the inrush current suppressing section remains in the second state, has occurred in the inrush current suppressing section. Accordingly, the occurrence of the abnormality can be informed to the driver, and early repair can be urged. Such the informing section (first informing section) can be provided also in the starter controller according to other example aspect of the present invention having the function to determine that the fixation abnormality, in which the inrush current suppressing section remains in the second state, has occurred in the inrush current suppressing section as the function of the abnormality detecting section likewise.

According to a ninth example aspect of the present invention, in the starter controller according to the eighth example aspect of the present invention, the starter is constructed to be switchable between a state where the pinion gear is engaged with the ring gear and a state where the pinion gear is disengaged from the ring gear regardless of whether the motor is energized or not.

The abnormality detecting section performs first state fixation abnormality detection processing at non-start timing as processing for detecting whether the fixation abnormality, in which the inrush current suppressing section remains in the first state, has occurred in the inrush current suppressing section during the operation of the engine.

In the first state fixation abnormality detection processing at non-start timing, the pinion gear is disengaged from the ring gear, the inrush current suppressing section is driven to the second state, the switching section is driven to the on-state, it is determined whether the output voltage of the power supply at that time becomes lower than the determination value of first state fixation, and it is determined that the fixation abnormality, in which the inrush current suppressing section remains in the first state, has occurred in the inrush current suppressing section if the output voltage does not become lower than the determination value of first state fixation.

In short, in the first state fixation abnormality detection processing at non-start timing, during the operation of the engine in which the cranking is unnecessary, energization of the starter motor is tried while disengaging the pinion gear of the starter from the ring gear of the engine. Thus, it is determined whether the first state fixation abnormality has occurred in the inrush current suppressing section without causing the starter to crank the engine.

With such the construction, the occurrence of the first state fixation abnormality in the inrush current suppressing section can be detected before the engine start. When the starter motor is energized by the start energization processing with the starter controller according to the ninth example aspect of the present invention, the pinion gear may be engaged with the ring gear and the starter may be caused to crank the engine like the starter controller according to the fifth example aspect of the present invention.

According to a tenth example aspect of the present invention, in the starter controller according to the ninth example aspect of the present invention, an energization time of the motor by the start energization processing is limited to a predetermined limit time when the abnormality detecting section determines that the fixation abnormality, in which the inrush current suppressing section remains in the first state, has occurred in the inrush current suppressing section. That is, if the first state fixation abnormality of the inrush current suppressing section is detected during the operation of the engine, the time of the energization to the starter motor in the next engine start is limited to the limit time.

With such the construction, burning out of the resistor of the inrush current suppressing section due to the energization to the starter motor can be prevented. Specifically, if the motor is energized for a long time when the first state fixation abnormality has occurred in the inrush current suppressing section, there is a possibility that the resistor of the inrush current suppressing section burns out. If the resistor burns out, the energization to the starter motor cannot be performed thereafter. The above-described construction can prevent such the situation. The above-described limit time may be set to a time shorter than an energization time, with which the resistor burns out.

According to an eleventh example aspect of the present invention, the starter controller according to any one of the eighth to tenth example aspects of the present invention further has a second informing section. The second informing section informs the vehicle driver of the occurrence of the fixation abnormality, in which the inrush current suppressing section remains in the first state, when the abnormality detecting section determines that the fixation abnormality, in which the inrush current suppressing section remains in the first state, has occurred. Accordingly, the occurrence of the abnormality can be informed to the driver, and early repair can be urged. Such the informing section (second informing section) can be provided also in the starter controller according to other example aspect of the present invention having the function to determine that the fixation abnormality, in which the inrush current suppressing section remains in the first state, has occurred in the inrush current suppressing section as the function of the abnormality detecting section likewise.

According to a twelfth example aspect of the present invention, the starter controller is the same as the starter controller according to the sixth example aspect of the present invention assuming the starter controller according to the fifth example aspect of the present invention. In addition, the second determination value of second state fixation is set at a value smaller than the first determination value of second state fixation.

The reason is as follows. That is, the engine is cranked when the second state fixation abnormality detection processing at start timing is performed. The engine is not cranked when the second state fixation abnormality detection processing at non-start timing is performed. Therefore, the current flowing through the starter motor in the former case is larger than the current flowing through the starter motor in the latter case by an increase amount of a rotation load of the motor. Therefore, the output voltage of the power supply in the former case tends to decrease as compared to the latter case. Therefore, the second determination value of second state fixation used in the former case is set at a value smaller than the first determination value of second state fixation used in the latter case. Thus, abnormality determination accuracy in the both cases, i.e., abnormality determination accuracy of the second state fixation abnormality detection processing at start timing and abnormality determination accuracy of the second state fixation abnormality detection at non-start timing, can be improved.

According to a thirteenth example aspect of the present invention, in the starter controller according to the fifth or twelfth example aspect of the present invention, the abnormality detecting section performs the second state fixation abnormality detection processing at non-start timing when running speed of the vehicle is higher than zero.

According to a fourteenth example aspect of the present invention, in the starter controller according to the ninth example aspect of the present invention, the abnormality detecting section performs the first state fixation abnormality detection processing at non-start timing when running speed of the vehicle is higher than zero.

It is because, in the second state fixation abnormality detection processing at non-start timing and the first state fixation abnormality detection processing at non-start timing, the starter motor is energized under the situation where there is essentially no need to energize the starter motor and therefore the operation sound of the starter motor should not be preferably audible to the occupant of the vehicle. If the vehicle speed is not zero, it is thought that the operation sound of the starter motor is less audible because of the running sound of the vehicle.

According to a fifteenth example aspect of the present invention, the inrush current suppressing section is a switching element that is provided to the power supply line and constructed such that the switching element is driven to the first state when drive of switching control for alternately switching the switching element between an on-state and an off-state is performed and is driven to the second state when drive for continuing the on-state of the switching element is performed. In this case, a degree of the suppression of the current to the starter motor can be changed by changing a duty ratio of the switching control of the switching element. The duty ratio is a ratio of an on-state time to a single cycle time, which is the sum of the on-state time and an off-state time.

In the case where the switching element is used as the inrush current suppressing section, according to a sixteenth example aspect of the present invention, the abnormality detecting section detects whether the uncontrollable abnormality has occurred in the inrush current suppressing section based on the output voltage at the time when the switching section is driven to the on-state. If the switching section is in the on-state, the current flowing from the power supply to the starter motor changes with the state of the switching element as the inrush current suppressing section. The output voltage of the power supply also changes due to the voltage drop inside the power supply. More specifically, the output voltage of the power supply decreases more as the current increases more. Therefore, the actual state of the switching element can be grasped from the output voltage of the power supply.

Therefore, more specifically, according to a seventeenth example aspect of the present invention, the abnormality detecting section determines whether the output voltage of the power supply becomes lower than a predetermined determination value of on-state fixation when the inrush current suppressing section is driven to the first state or the off-state and the switching section is driven to the on-state. The abnormality detecting section determines that the fixation abnormality (referred to also as on-state fixation abnormality), in which the inrush current suppressing section remains in the on-state, has occurred in the inrush current suppressing section if the output voltage becomes lower than the determination value of on-state fixation.

According to a twenty-first example aspect of the present invention, the abnormality detecting section determines whether the output voltage of the power supply becomes lower than a predetermined determination value of off-state fixation when the inrush current suppressing section is driven to the second state (i.e., on-state) and the switching section is driven to the on-state. The abnormality detecting section determines that the fixation abnormality (referred to also as off-state fixation abnormality), in which the inrush current suppressing section remains in the off-state, has occurred in the inrush current suppressing section if the output voltage does not become lower than the determination value of off-state fixation.

According to an eighteenth example aspect of the present invention, in the starter controller according to the seventeenth example aspect of the present invention, the starter has a pinion gear that is rotated by the motor and that cranks the engine when the pinion gear is rotated in a state where the pinion gear is engaged with a ring gear of the engine. The starter is constructed to be switchable between a state where the pinion gear is engaged with the ring gear and a state where the pinion gear is disengaged from the ring gear regardless of whether the motor is energized or not.

The abnormality detecting section performs on-state fixation abnormality detection processing at non-start timing as processing for detecting whether the fixation abnormality, in which the inrush current suppressing section remains in the on-state, has occurred in the inrush current suppressing section during the operation of the engine.

In the on-state fixation abnormality detection processing at non-start timing, the pinion gear is disengaged from the ring gear, the inrush current suppressing section is driven to the first state or the off-state, the switching section is driven to the on-state, it is determined whether the output voltage of the power supply at that time becomes lower than a first determination value of on-state fixation, and it is determined that the fixation abnormality, in which the inrush current suppressing section remains in the on-state, has occurred in the inrush current suppressing section if the output voltage becomes lower than the first determination value of on-state fixation.

In short, in the on-state fixation abnormality detection processing at non-start timing, during the operation of the engine in which the cranking is unnecessary, the pinion gear of the starter is disengaged from the ring gear of the engine. Thus, it is determined whether the on-state fixation abnormality has occurred in the inrush current suppressing section without cranking the engine.

With such the construction, the occurrence of the on-state fixation abnormality in the inrush current suppressing section can be detected before the engine start. When the starter motor is energized by the start energization processing with the starter controller according to the eighteenth example aspect of the present invention, the pinion gear may be engaged with the ring gear and the starter may be caused to crank the engine.

According to a nineteenth example aspect of the present invention, in the starter controller according to the seventeenth or eighteenth example aspect of the present invention, the abnormality detecting section performs on-state fixation abnormality detection processing at start timing as processing for detecting whether the fixation abnormality, in which the inrush current suppressing section remains in the on-state, has occurred in the inrush current suppressing section when the starter controller performs the start energization processing to drive the inrush current suppressing section to the first state and to drive the switching section to the on-state. In the on-state fixation abnormality detection processing at start timing, it is determined whether the output voltage of the power supply becomes lower than a second determination value of on-state fixation and it is determined that the fixation abnormality, in which the inrush current suppressing section remains in the on-state, has occurred in the inrush current suppressing section if the output voltage becomes lower than the second determination value of on-state fixation.

In short, in the on-state fixation abnormality detection processing at start timing, it is determined whether the on-state fixation abnormality has occurred in the inrush current suppressing section by using the start energization processing performed to start the engine. This scheme provides an advantage that there is no need to drive the inrush current suppressing section and the switching section only for the abnormality detection.

The second determination value of on-state fixation abnormality may be the same value as or a different value from the first determination value of on-state fixation abnormality.

According to a twentieth example aspect of the present invention, the starter controller according to any one of the seventeenth to nineteenth example aspects of the present invention further has a first informing section. The first informing section informs the vehicle driver of the occurrence of the fixation abnormality, in which the inrush current suppressing section remains in the on-state, when the abnormality detecting section determines that the fixation abnormality, in which the inrush current suppressing section remains in the on-state, has occurred in the inrush current suppressing section. Accordingly, the occurrence of the abnormality can be informed to the driver, and early repair can be urged. Such the informing section (first informing section) can be provided also in the starter controller according to other example aspect of the present invention having the function to determine that the fixation abnormality, in which the inrush current suppressing section remains in the on-state, has occurred in the inrush current suppressing section as the function of the abnormality detecting section likewise.

According to a twenty-second example aspect of the present invention, in the starter controller according to the twenty-first example aspect of the present invention, the starter is constructed to be switchable between a state where the pinion gear is engaged with the ring gear of the engine and a state where the pinion gear is disengaged from the ring gear regardless of whether the motor is energized or not.

The abnormality detecting section performs off-state fixation abnormality detection processing at non-start timing as processing for detecting whether the fixation abnormality, in which the inrush current suppressing section remains in the off-state, has occurred in the inrush current suppressing section during the operation of the engine.

In the off-state fixation abnormality detection processing at non-start timing, the pinion gear is disengaged from the ring gear, the inrush current suppressing section is driven to the second state (i.e., on-state), the switching section is driven to the on-state, it is determined whether the output voltage of the power supply at that time becomes lower than the determination value of off-state fixation, and it is determined that the fixation abnormality, in which the inrush current suppressing section remains in the off-state, has occurred in the inrush current suppressing section if the output voltage does not become lower than the determination value of off-state fixation.

In short, in the off-state fixation abnormality detection processing at non-start timing, during the operation of the engine in which the cranking is unnecessary, energization of the starter motor is tried while disengaging the pinion gear of the starter from the ring gear of the engine. Thus, it is determined whether the off-state fixation abnormality has occurred in the inrush current suppressing section without causing the starter to crank the engine.

With such the construction, the occurrence of the off-state fixation abnormality in the inrush current suppressing section can be detected before the engine start. When the starter motor is energized by the start energization processing with the starter controller according to the twenty-second example aspect of the present invention, the pinion gear may be engaged with the ring gear and the starter may be caused to crank the engine.

According to a twenty-third example aspect of the present invention, the starter controller according to the twenty-first or twenty-second example aspect of the present invention further has a second informing section. The second informing section informs the vehicle driver of the occurrence of the fixation abnormality, in which the inrush current suppressing section remains in the off-state, when the abnormality detecting section determines that the fixation abnormality, in which the inrush current suppressing section remains in the off-state, has occurred. Accordingly, the occurrence of the abnormality can be informed to the driver, and early repair can be urged. Such the informing section (second informing section) can be provided also in the starter controller according to other example aspect of the present invention having the function to determine that the fixation abnormality, in which the inrush current suppressing section remains in the off-state, has occurred in the inrush current suppressing section as the function of the abnormality detecting section likewise.

According to a twenty-fourth example aspect of the present invention, the starter controller is the same as the starter controller according to the nineteenth example aspect of the present invention assuming the starter controller according to the eighteenth example aspect of the present invention. In addition, the second determination value of on-state fixation is set at a value smaller than the first determination value of on-state fixation.

The engine is cranked when the on-state fixation abnormality detection processing at start timing is performed. The engine is not cranked when the on-state fixation abnormality detection processing at non-start timing is performed. The current flowing through the starter motor in the former case is larger than the current flowing through the starter motor in the latter case by the increase amount of the rotation load of the motor. Therefore, the output voltage of the power supply tends to decrease in the former case as compared to the latter case. Therefore, the second determination value of on-state fixation used in the former case is set at the smaller value than the first determination value of on-state fixation used in the latter case. Thus, abnormality determination accuracy in the both cases, i.e., abnormality determination accuracy of the on-state fixation abnormality detection processing at start timing and abnormality determination accuracy of the on-state fixation abnormality detection at non-start timing, can be improved.

According to a twenty-fifth example aspect of the present invention, in the starter controller according to the eighteenth or twenty-fourth example aspect of the present invention, the abnormality detecting section performs the on-state fixation abnormality detection processing at non-start timing when running speed of the vehicle is higher than zero.

It is because the on-state fixation abnormality detection processing at non-start timing is performed under the situation where there is essentially no need to energize the starter motor and therefore the operation sound of the starter motor accompanying the energization to the starter motor should not be preferably audible to the occupant of the vehicle. If the vehicle speed is not zero, it is thought that the operation sound of the starter motor is less audible due to the running sound of the vehicle.

In the case where the inrush current suppressing section is driven to the off-state in the on-state fixation abnormality detection processing at non-start timing, the starter motor is not energized if the inrush current suppressing section is normal. However, if the on-state fixation abnormality has occurred in the inrush current suppressing section, the starter motor is energized and operates. Therefore, also in this case, the operation sound should not be preferably audible to the occupant.

According to a twenty-sixth example aspect of the present invention, in the starter controller according to the twenty-second example aspect of the present invention, the abnormality detecting section performs the off-state fixation abnormality detection processing at non-start timing when running speed of the vehicle is higher than zero.

It is because, in the off-state fixation abnormality detection processing at non-start timing, if the inrush current suppressing section is normal, the starter motor is energized under the situation where there is essentially no need to energize the starter motor and therefore the operation sound of the starter motor should not be preferably audible to the occupant of the vehicle. If the vehicle speed is not zero, it is thought that the operation sound of the starter motor is less audible because of the running sound of the vehicle.

According to a twenty-seventh example aspect of the present invention, in the starter controller according to the sixteenth example aspect of the present invention, the abnormality detecting section monitors the output voltage of the power supply when the starter controller performs the start energization processing to drive the inrush current suppressing section to the first state and to drive the switching section to the on-state. The abnormality detecting section determines that the fixation abnormality, in which the inrush current suppressing section remains in the on-state, has occurred in the inrush current suppressing section if the output voltage becomes lower than a predetermined determination value of on-state fixation. The abnormality detecting section determines that the fixation abnormality, in which the inrush current suppressing section remains in the off-state, has occurred in the inrush current suppressing section if the output voltage does not become lower than a determination value of off-state fixation higher than the determination value of on-state fixation.

With such the construction, the on-state fixation abnormality and the off-state fixation abnormality of the inrush current suppressing section can be detected distinctly from each other by using the start energization processing performed to start the engine. This scheme provides an advantage that there is no need to drive the inrush current suppressing section and the switching section only for the abnormality detection.

According to a twenty-eighth example aspect of the present invention, in the starter controller according to the sixteenth or twenty-seventh example aspect of the present invention, the starter is constructed to be switchable between a state where the pinion gear is engaged with the ring gear and a state where the pinion gear is disengaged from the ring gear regardless of whether the motor is energized or not.

The abnormality detecting section disengages the pinion gear from the ring gear, drives the inrush current suppressing section to the first state, drives the switching section to the on-state, and monitors the output voltage of the power supply at that time during the operation of the engine. The abnormality detecting section determines that the fixation abnormality, in which the inrush current suppressing section remains in the on-state, has occurred in the inrush current suppressing section if the output voltage becomes lower than a predetermined determination value of on-state fixation. The abnormality detecting section determines that the fixation abnormality, in which the inrush current suppressing section remains in the off-state, has occurred in the inrush current suppressing section if the output voltage does not become lower than a determination value of off-state fixation higher than the determination value of on-state fixation.

With such the construction, the on-state fixation abnormality and the off-state fixation abnormality of the inrush current suppressing section can be detected distinctly from each other before the engine start.

In the case where the abnormality detecting section operates during the operation of the engine in the starter controller, the abnormality detecting section may be constructed to operate only when the running speed of the vehicle is higher than zero. Such the construction is preferable because the operation sound of the motor due to the energization for the abnormality detection becomes less audible to the occupant because of the running sound of the vehicle.

In the starter controller according to the twenty-eighth example aspect of the present invention assuming the starter controller according to the twenty-seventh example aspect of the present invention, the determination value (i.e., determination value of on-state fixation and determination value of off-state fixation) used by the abnormality detecting section that operates when the start energization processing is performed and the determination value (i.e., determination value of on-state fixation and determination value of off-state fixation) used by the abnormality detecting section that operates during the operation of the engine may be the same value or may be different values. The determination value of on-state fixation used by the abnormality detecting section that operates when the start energization processing is performed may be set at a value smaller than the determination value of on-state fixation used by the abnormality detection section that operates during the operation of the engine. The reason is the same as the reason mentioned about the starter controller according to the twenty-fourth example aspect of the present invention.

According to a twenty-ninth example aspect of the present invention, in the starter controller according to the third example aspect of the present invention, the abnormality detecting section senses change speed of the output voltage at the time when the starter controller performs the start energization processing to drive the inrush current suppressing section to the first state and to drive the switching section to the on-state. The abnormality detecting section determines that the fixation abnormality, in which the inrush current suppressing section remains in the second state, has occurred in the inrush current suppressing section if the change speed is equal to or higher than a predetermined value.

With such the construction, the occurrence of the second state fixation abnormality in the inrush current suppressing section at the engine start can be detected without driving the inrush current suppressing section and the switching section only for the abnormality detection.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Hereafter, an electronic control unit (referred to as ECU, hereafter) as a starter controller according to each of embodiments of the present invention will be explained.

First Embodiment

Figure 1:
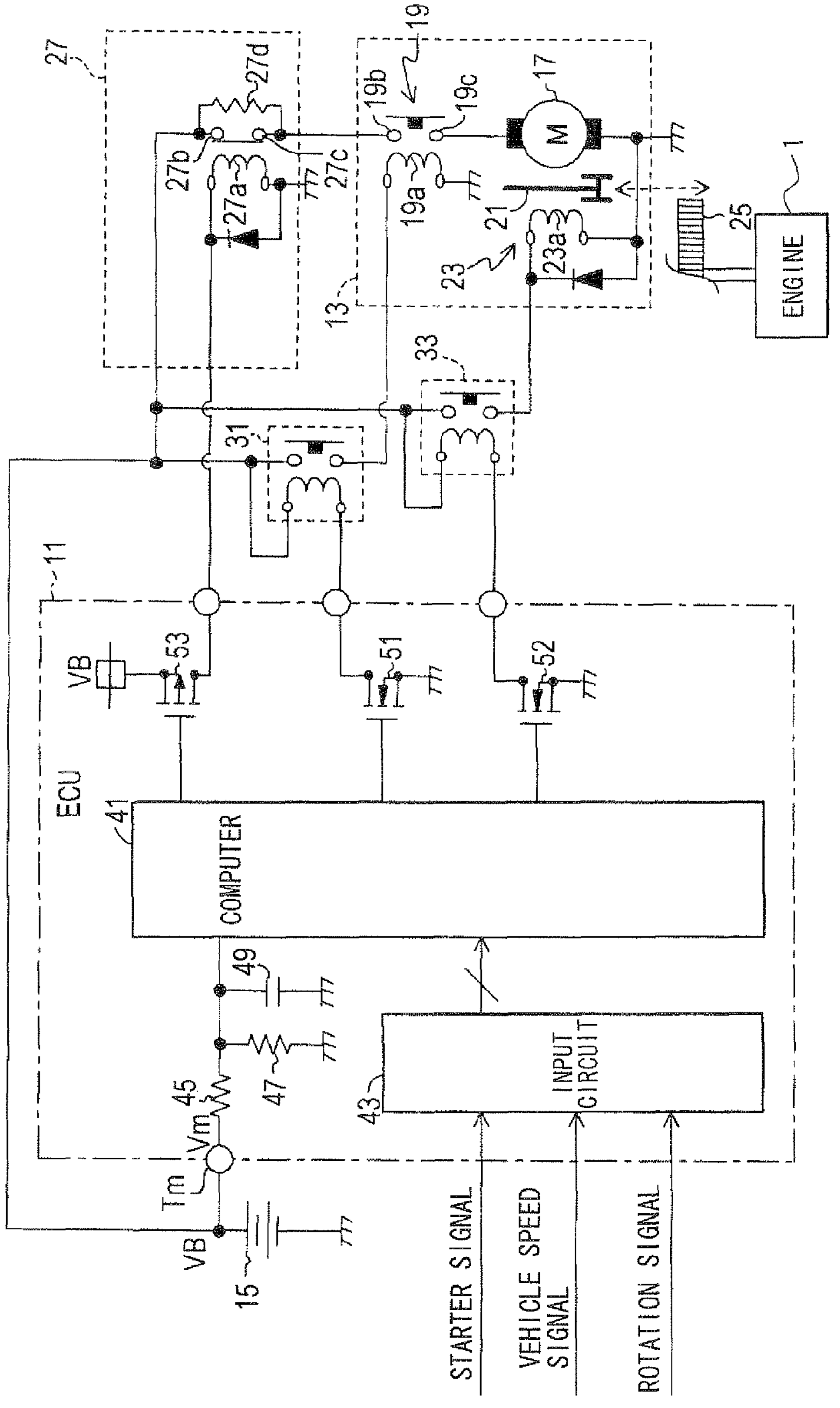
FIG. 1 is a construction diagram showing an ECU and its peripheral devices according to a first embodiment of the present invention.

FIG. 1 is a construction diagram showing an ECU 11 and its peripheral devices according to a first embodiment of the present invention. The ECU 11 performs control of a starter 13 for starting an engine 1 of a vehicle.

The ECU 11 receives input of a starter signal, which is brought to an active level if a driver of the vehicle performs a starting operation (e.g., operation for twisting key, which is inserted in key cylinder, to start position or operation for pushing start button), a vehicle speed signal from a sensor for sensing running speed of the vehicle (i.e., vehicle speed), a rotation signal from a crankshaft sensor or a camshaft sensor and the like.

A battery voltage VB as an output voltage of an in-vehicle battery 15 (equivalent to power supply) is inputted to a voltage monitoring terminal Tm of the ECU 11. When the battery voltage VB is supplied to an ignition system power supply line of the vehicle (i.e., in the case of ignition-on), the ECU 11 operates using an electric power from the ignition system power supply line.

The starter 13 has a motor 17 (starter motor) as a power source for cranking the engine 1, an electromagnetic switch 19 for energizing the motor 17, a pinion gear 21 driven and rotated by the motor 17, and a pinion actuation solenoid 23.

The electromagnetic switch 19 is a large-size relay provided in a power supply line extending from the battery 15 to the motor 17. The electromagnetic switch 19 is selectively driven between an on-state for connecting the power supply line and an off-state for disconnecting the power supply line. The electromagnetic switch 19 has a coil 19*a*, an end of which is connected to a ground line, and a pair of contacts 19*b*, 19*c*. If the battery voltage VB is applied to the other end of the coil 19*a* to energize the coil 19*a*, the contacts 19*b*, 19*c* short-circuit and connect the power supply line (i.e., on-state is formed). If the coil 19*a* is deenergized, the contacts 19*b*, 19*c* open to disconnect the power supply line (i.e., off-state is formed).

The pinion actuation solenoid 23 is a solenoid for switching the pinion gear 21 between a state where the pinion gear 21 is engaged with a ring gear 25 of the engine 1 and a state where the pinion gear 21 is disengaged from the ring gear 25.

The pinion actuation solenoid 23 has a coil 23*a*, an end of which is connected to the ground line, and a biasing member such as a spring (not shown). When the coil 23*a* is deenergized, the pinion actuation solenoid 23 positions the pinion gear 21 in an initial position (position shown in FIG. 1), where the pinion gear 21 is disengaged from the ring gear 25, by using the force of the biasing member. If the battery voltage VB is applied to the other end of the coil 23*a* to energize the coil 23*a*, the pinion actuation solenoid 23 causes the pinion gear 21 to protrude to an outside of the starter 13 as shown by a dotted arrow mark in FIG. 1 by using an electromagnetic force caused by the energization. Thus, the pinion gear 21 is engaged with the ring gear 25.

If the motor 17 is energized in the state where the pinion gear 21 is engaged with the ring gear 25, a rotational force of the motor 17 is transmitted to the ring gear 25 through the pinion gear 21. Thus, the engine 1 is cranked.

An inrush current reduction relay 27 (ICR relay) for suppressing an inrush current to the motor 17 is provided in the power supply line extending from the battery 15 to the contacts 19*b*, 19*c* of the electromagnetic switch 19 in the vehicle.

The ICR relay 27 has a coil 27*a*, an end of which is connected to the ground line, a pair of contacts 27*b*, 27*c* connected in series with the power supply line extending to the motor 17, and a resistor 27*d* (current suppression resistor) connected in parallel to the contacts 27*b*, 27*c* for current suppression. If the battery voltage VB is applied to the other end of the coil 27*a* to energize the coil 27*a*, the contacts 27*b*, 27*c* open to form a first state, in which the resistor 27*d* is inserted into the power supply line extending to the motor 17 in series. If the coil 27*a* is deenergized, the contacts 27*b*, 27*c* short-circuit and form a second state, in which the power supply line is connected without inserting the resistor 27*d* into the power supply line. In the following description, the first state of the ICR relay 27 will be referred to as "a resistor side," and the second state of the ICR relay 27 will be referred to as "a contact side."

Therefore, if the ICR relay 27 is brought to the resistor side and the electromagnetic switch 19 is brought to the on-state (i.e., contacts 19*b*, 19*c* are short-circuited), the current flows from the battery 15 to the motor 17 through the resistor 27*d*. If the ICR relay 27 is brought to the contact side and the electromagnetic switch 19 is brought to the on-state, the current flows from the battery 15 to the motor 17 without passing through the resistor 27*d*.

In the vehicle, a relay 31 for motor drive and a relay 33 for pinion drive are provided outside the ECU 11. When the motor drive relay 31 is switched on, the motor drive relay 31 applies the battery voltage VB to the other end of the coil 19*a* of the electromagnetic switch 19 to pass the current to the coil 19*a* and to bring the electromagnetic switch 19 to the on-state. When the pinion drive relay 33 is switched on, the pinion drive relay 33 applies the battery voltage VB to the other end of the coil 23*a* of the pinion actuation solenoid 23 to pass the current to the coil 23*a* and to engage the pinion gear 21 with the ring gear 25 of the engine 1.

The ECU 11 has a microcomputer 41, an input circuit 43, two resistors 45, 47 and a capacitor 49. The microcomputer 41 executes various types of processing for controlling the starter 13. The input circuit 43 inputs the various signals such as the starter signal to the microcomputer 41. The two resistors 45, 47 divide the battery voltage VB, which is inputted from the voltage monitor terminal Tm, into a voltage value in a range of voltage that can be inputted to the microcomputer 41. Hereafter, the battery voltage VB inputted from the voltage monitor terminal Tm will be referred to also as a monitor voltage Vm. The capacitor 49 is provided between a voltage line at a connection between the two resistors 45, 47 and the ground line in order to remove a noise. The microcomputer 41 senses the battery voltage VB by performing A/D conversion of the voltage at the connection between the two resistors 45, 47 with an internal A/D converter (not shown). The microcomputer 41 senses a voltage value of an analog signal among the signals inputted from the input circuit 43 by performing the A/D conversion of the analog signal with the internal A/D converter.

The ECU 11 has transistors 51, 52, 53. When the transistor 51 is switched on, the transistor 51 passes the current to the coil of the motor drive relay 31 to switch on the relay 31. When the transistor 52 is switched on, the transistor 52 passes the current to the coil of the pinion drive relay 33 to switch on the relay 33. When the transistor 53 is switched on, the transistor 53 passes the current to the coil 27*a* of the ICR relay 27 to switch the ICR relay 27 to the resistor side. The transistors 51-53 are driven by the microcomputer 41.

Figure 2:
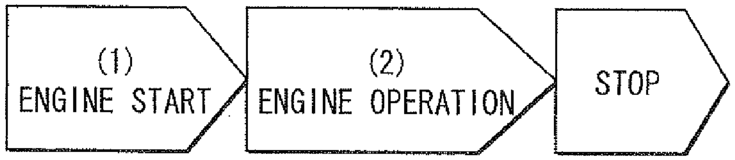
FIG. 2 is a diagram illustrating a state of an engine in a chronological order according to the first embodiment.

Next, contents of the processing performed by the microcomputer 41 will be explained with reference to FIG. 2, FIG. 2 shows states of the engine 1 in time series. First, when the vehicle driver performs the starting operation and the starter signal switches to the active level (e.g., high level), the microcomputer 41 causes the starter 13 to crank the engine 1 to start the engine 1. This state is a state of "(1) ENGINE START" shown in FIG. 2.

In concrete processing, the microcomputer 41 switches on the transistor 52 to switch on the relay 33, thereby passing the current to the coil 23*a* of the pinion actuation solenoid 23 and engaging the pinion gear 21 with the ring gear 25.

The microcomputer 41 switches on the transistor 53 to drive the ICR relay 27 to the resistor side. In addition, the microcomputer 41 switches on the transistor 51 to switch on the relay 31 and to bring the electromagnetic switch 19 to the on-state. When a predetermined time t elapses thereafter, the microcomputer 41 switches off the transistor 53 while maintaining the transistor 51 at the on-state (i.e., while maintaining electromagnetic switch 19 at on-state). Thus, the ICR relay 27 is switched to the contact side (refer to FIG. 4).

Accordingly, the current flows from the battery 15 to the motor 17 through the resistor 27*d* of the ICR relay 27 first. Thus, the motor 17 starts rotating while the inrush current to the motor 17 is suppressed. Then, when the inrush current substantially ceases, the ICR relay 27 switches from the resistor side to the contact side and the current flows to the motor 17 not through the resistor 27*d*.

The above-mentioned predetermined time t may be fixed or variable. When the predetermined time t is variable, the predetermined time t can be varied according to the value of the battery voltage VB, for example. Alternatively, for example, the current flowing to the motor 17 may be monitored, and the predetermined time t may be varied according to a time until the current becomes the maximum peak value.

With such the energization to the motor 17, the pinion gear 21 rotates the ring gear 25 (i.e., cranks engine 1). Thus, another ECU controlling the engine 1 performs fuel injection and ignition to the engine 1. If the engine 1 is a diesel engine, the ignition is not performed but only the fuel injection is performed. Alternatively, a system configuration may be set such that the ECU 11 also performs such the control of the engine 1.

If the microcomputer 41 determines that the engine 1 is brought to a complete explosion state (i.e., state where start is completed or state where engine 1 has been started), the microcomputer 41 switches off the transistors 51, 52 to deenergize the motor 17 and to return the pinion gear 21 to the initial position where the pinion gear 21 is disengaged from the ring gear 25. The microcomputer 41 calculates engine rotation speed from the above-mentioned rotation signal and determines whether the engine 1 is brought to the complete explosion state based on the engine rotation speed.

The above is the starter control during the engine start. The state where the engine 1 is in the operating state is "(2) ENGINE OPERATION" shown in FIG. 2. "(3) STOP" in the right end of FIG. 2 indicates a state where the engine 1 is stopped because the driver has performed the operation for stopping the engine 1. In this case, also the ignition system power supply in the vehicle is switched off.

The microcomputer 41 according to the present embodiment performs diagnostic processing (abnormality detection processing) for detecting a fixation abnormality (uncontrollable abnormality) of the ICR relay 27 in each of the above-mentioned engine start ((1) in FIG. 2) and the engine operation ((2) in FIG. 2). Next, the diagnostic processing will be explained.

Figure 3A:
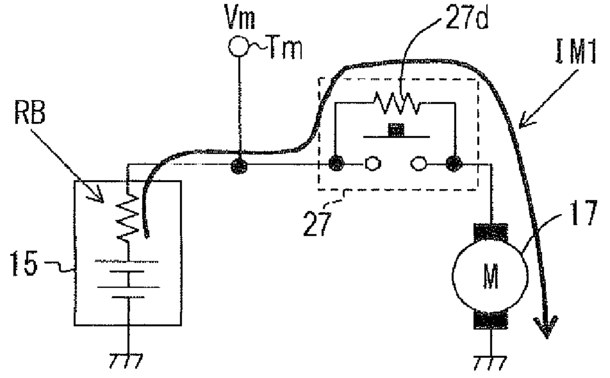
FIGS. 3A and 3B are diagrams illustrating a detection principle of a fixation abnormality of an ICR relay according to the first embodiment.
Figure 3B:
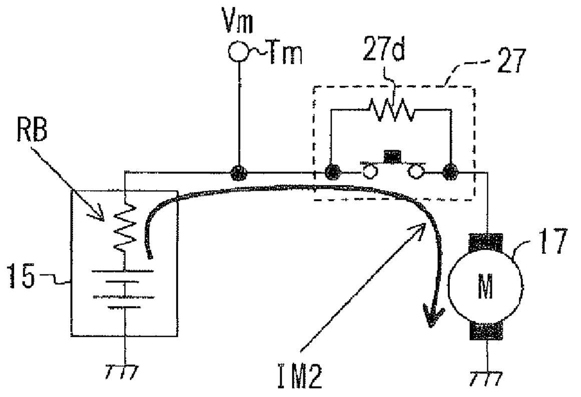

First, a detection principle of the fixation abnormality of the ICR relay 27 will be explained. FIG. 3A shows a route of the current in the case where the ICR relay 27 is set to the resistor side and the motor 17 is energized. FIG. 3B shows a route of the current in the case where the ICR relay 27 is set to the contact side and the motor 17 is energized.

In the case of FIG. 3A, the current flows to the motor 17 through the resistor 27*d* of the ICR relay 27. In the case of FIG. 3B, the resistor 27*d* is ineffective and the current flows to the motor 17 through the contacts 27*b*, 27*c* of the ICR relay 27. Therefore, the current IM1 (motor current) flowing through the motor 17 in the case of FIG. 3A is smaller than the motor current IM2 in the case of FIG. 3B. There is an impedance RB (internal impedance) inside the battery 15 and is several milliohms in general.

The battery voltage VB in the case where the ICR relay 27 is driven to the resistor side (by energizing coil 27*a*) and the motor 17 is energized may be defined as VB1. The battery voltage VB in the case where the ICR relay 27 is driven to the contact side (by deenergizing coil 27*a*) and the motor 17 is energized may be defined as VB2. In this case, if the ICR relay 27 is normal, the battery voltage VB1 is higher than the battery voltage VB2. It is because the motor current IM1 is smaller than the motor current IM2 and the voltage drop inside the battery 15 is smaller in the former case than in the latter case.

Figure 4:
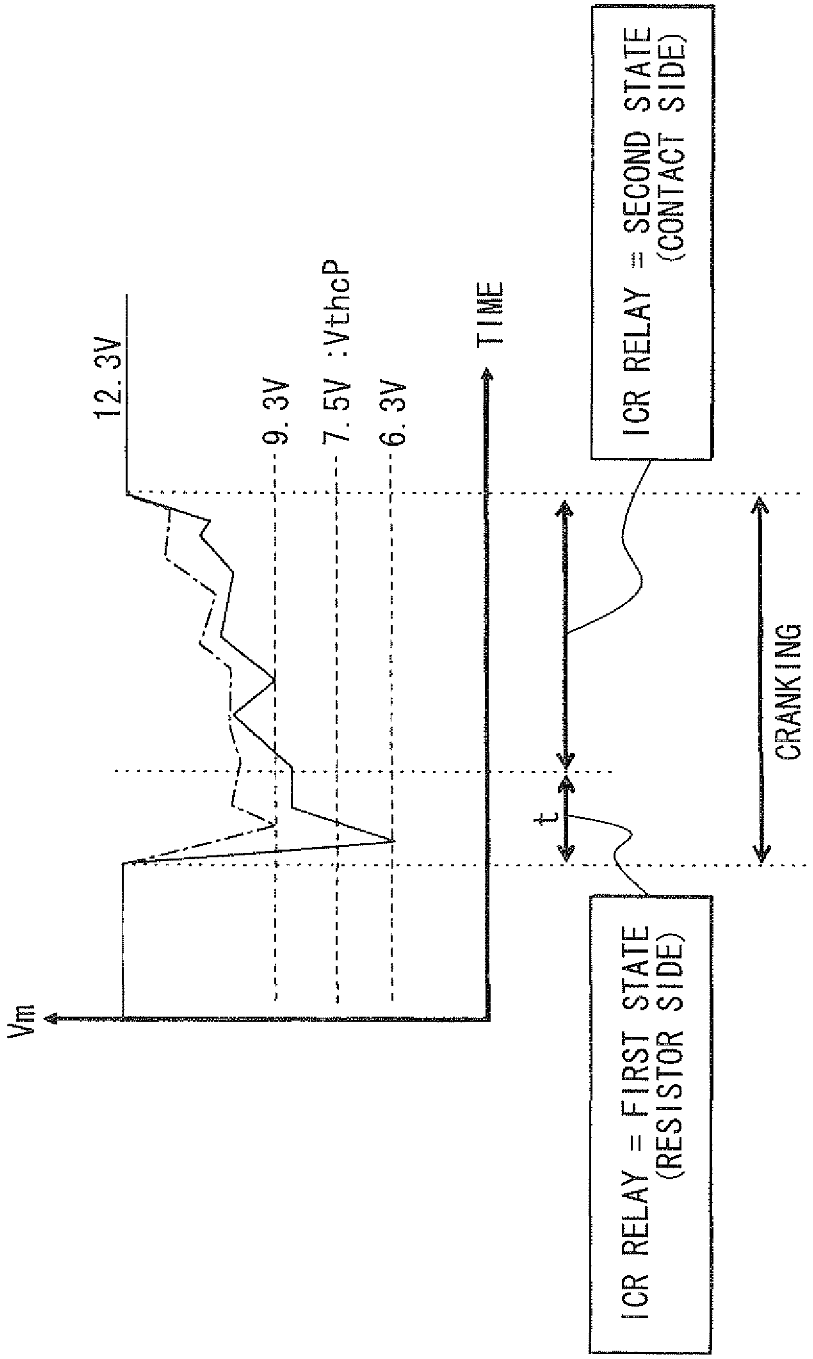
FIG. 4 is another diagram illustrating the detection principle of the fixation abnormality of the ICR relay according to the first embodiment.

For example, a chained line in FIG. 4 shows a waveform of the monitor voltage Vm (=battery voltage VB) at the engine start. The chained line shows the waveform of the monitor voltage Vm in the case where the starter 13 is caused to crank the engine 1 by passing the current to the motor 17 through the resistor 27*d* of the ICR relay 27 first and then by performing the control to pass the current to the motor 17 without passing the current through the resistor 27*d* when a predetermined time t elapses thereafter.

A solid line in FIG. 4 shows a waveform of the monitor voltage Vm in the case where the starter 13 is caused to crank the engine 1 by maintaining the ICR relay 27 at the contact side such that the current passes to the motor 17 without passing through the resistor 27*d* from the beginning.

As shown in FIG. 4, the minimum peak value of the monitor voltage Vm is lower in the case of the solid line than in the case of the chained line because the inrush current to the motor 17 is larger in the case of the solid line than in the case of the chained line. In the example of FIG. 4, the value of the battery voltage VB at the time when the motor 17 is deenergized is 12.3 V. The internal impedance RB of the battery 15 is 6 mΩ and the resistance of the resistor 27*d* is also 6 mΩ. The motor current at the cranking start in the case where the ICR relay 27 is on the contact side is 1000 A. The internal impedance of the motor 17 is ignored.

On such the premises, when the ICR relay 27 is on the contact side, the voltage drop inside the battery 15 is 6 V (=1000 A×6 mΩ), and the monitor voltage Vm decreases to 6.3 V (=12.3 V−6 V). When the ICR relay 27 is on the resistor side, the resistance (=6 mΩ) of the resistor 27*d* is added to the power supply line to the motor 17. Thus, the motor current halves from 1000 A to 500 A, and the voltage drop inside the battery 5 becomes 3 V (=500 A×6 mΩ). Therefore, the minimum peak value of the monitor voltage becomes 9.3 V (=12.3 V−3 V).

Therefore, in FIG. 4, while the minimum peak value of the monitor voltage Vm shown by the solid line is 6.3 V, the minimum peak value of the monitor voltage Vm shown by the chained line is 9.3 V. Base on this voltage difference, it can be determined whether the ICR relay 27 is on the resistor side or the contact side.

Therefore, in the present embodiment, if the monitor voltage Vm in the case where the ICR relay 27 is driven to the resistor side and the motor 17 is energized becomes lower than a predetermined determination value, it is determined that a fixation abnormality (contact side fixation abnormality), in which the ICR relay 27 remains on the contact side, has occurred.

If the monitor voltage Vm in the case where the ICR relay 27 is driven to the contact side and the motor 17 is energized does not become lower than a predetermined determination value, it is determined that a fixation abnormality (resistor side fixation abnormality), in which the ICR relay 27 remains on the resistor side, has occurred.

A normal value of the minimum peak value of the monitor voltage Vm (9.3 V in FIG. 4) in the case where the ICR relay 27 is switched to the resistor side and the motor 17 is energized may be defined as a value Vp1. A normal value of the minimum peak value of the monitor voltage Vm (6.3 V in FIG. 4) in the case where the ICR relay 27 is switched to the contact side and the motor 17 is energized may be defined as a value Vp2. In this case, both of the above-mentioned determination values may be set between the values Vp1, Vp2.

Figure 5:
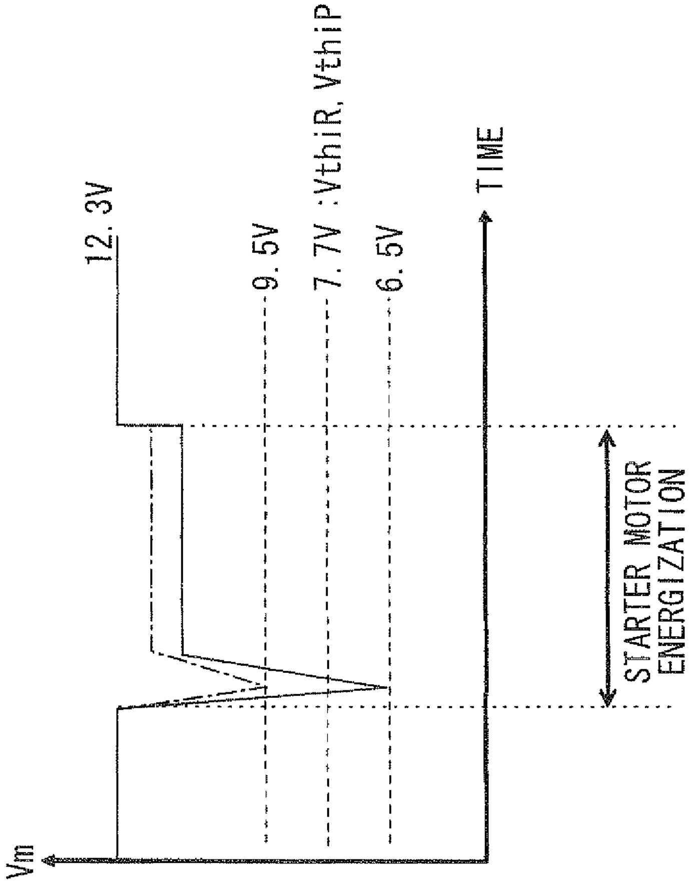
FIG. 5 is a further diagram illustrating the detection principle of the fixation abnormality of the ICR relay according to the first embodiment.

FIG. 5 shows another drive example than FIG. 4. A chained line in FIG. 5 shows a waveform of the monitor voltage Vm in the case where the motor 17 is energized while the pinion gear 21 is set at the initial position and the ICR relay 27 is maintained to the resistor side. A solid line in FIG. 5 shows a waveform of the monitor voltage Vm in the case where the motor 17 is energized while the pinion gear 21 is set at the initial position and the ICR relay 27 is maintained to the contact side.

As shown in FIG. 5, when the motor 17 is energized without causing the starter 13 to crank the engine 1 (i.e., when motor 17 is idled), the motor current decreases by decrease in a rotation load of the motor 17. Therefore, the monitor voltage Vm during the motor energization is slightly higher than in the case of FIG. 4. Comparison in terms of concrete numerical values is as follows. That is, in the example of FIG. 5, the minimum peak value of the monitor voltage Vm in the case where the ICR relay 27 is driven to the resistor side and the motor 17 is idled is 9.5 V. The minimum peak value of the monitor voltage Vm in the case where the ICR relay 27 is driven to the contact side and the motor 17 is idled is 6.5 V. The values 9.5 V and 6.5 V are slightly higher than the values 9.3V and 6.3 V in the case of FIG. 4.

Figure 6:
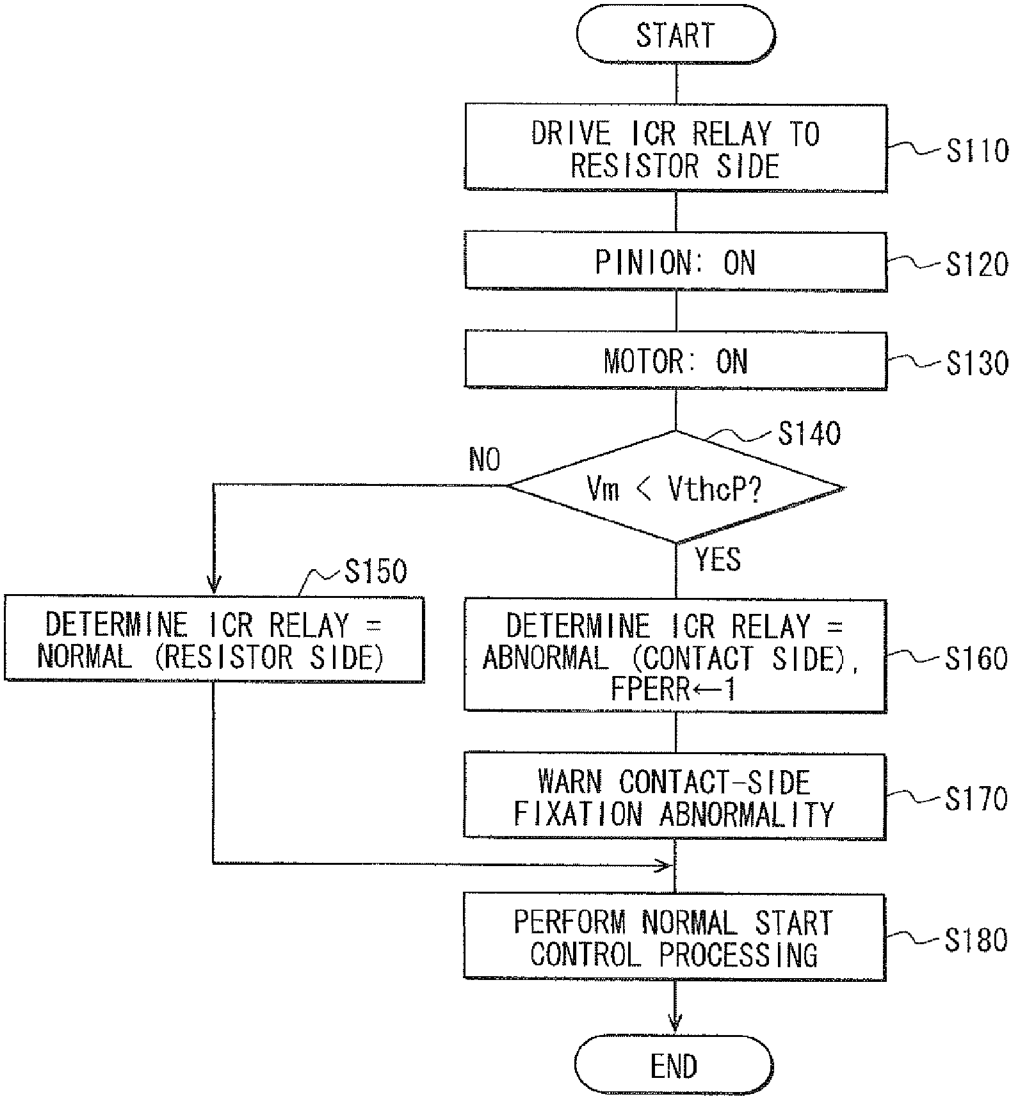
FIG. 6 is a flowchart showing diagnostic processing at start timing according to the first embodiment.

Next, in view of the above, concrete contents of the diagnostic processing performed by the microcomputer 41 will be explained with reference to flowcharts shown in FIGS. 6 and 7. FIG. 6 is a flowchart showing diagnostic processing at start timing. The diagnostic processing at start timing is started when the driver of the vehicle performs the starting operation and the starter signal becomes the active level in the above-mentioned engine start.

If the microcomputer 41 starts the diagnostic processing at start timing, the microcomputer 41 drives the ICR relay 27 to the resistor side by switching on the transistor 53 (i.e., by energizing coil 27*a*) in S110. In following S120, the microcomputer 41 switches on the transistor 52 to engage the pinion gear 21 with the ring gear 25. In following S130, the microcomputer 41 switches on the transistor 51 to bring the electromagnetic switch 19 to the on-state and to start the energization to the motor 17.

Accordingly, the current flows to the motor 17 through the resistor 27*d* of the ICR relay 27, whereby the cranking of the engine 1 is started. In the flowchart, "PINION: ON" means bringing the pinion gear 21 to the state where the pinion gear 21 meshes with the ring gear 25. "MOTOR: ON" means bringing the electromagnetic switch 19 to the on-state (and also starting energization to motor 17 in first embodiment).

Then, in S140, the A/D conversion of the monitor voltage Vm is performed multiple times at predetermined short intervals to sense the minimum peak value of the monitor voltage Vm. It is determined whether the minimum peak value is lower than a determination value VthcP for contact side fixation abnormality determination.

If the minimum peak value of the monitor voltage Vm is not lower than the determination value VthcP (i.e., if monitor voltage Vm does not become lower than determination value VthcP), it is determined in S150 that the ICR relay 27 is normal (i.e., ICR relay 27 is on resistor side as driven). Then, the process proceeds to S180.

The determination value VthcP used in S140 is a voltage between 9.3 V (=Vp1) and 6.3 V (=Vp2) as shown in FIG. 4. The determination value VthcP is set at 7.5 V, for example. In S140, the A/D conversion of the monitor voltage Vm may be performed once when a time, during which the battery voltage VB is anticipated to minimize, passes after the start of the energization to the motor 17. The value obtained by the A/D conversion may be used as the minimum peak value of the monitor voltage Vm.

If it is determined in S140 that the minimum peak value of the monitor voltage Vm is lower than the determination value VthcP (i.e., if monitor voltage Vm becomes lower than determination value VthcP), the process proceeds to S160. In S160, it is determined that the contact side fixation abnormality has occurred in the ICR relay 27 and an error flag FPERR indicating the occurrence of the contact side fixation abnormality is set at 1. In following S170, informing processing for informing the vehicle driver of the occurrence of the contact side fixation abnormality is performed, and then the process proceeds to S180. As the informing processing in S170, a warning lamp (indicator) is lit, a buzzer is set off, or a message is displayed to urge the vehicle driver to go to a car dealer or the like, for example.

In S180, normal start control processing for engine start is performed. The normal start control processing is remaining processing for realizing the above-mentioned starter control content at the engine start together with the processing from S110 to S130. In S180, first, it is determined whether the above-mentioned predetermined time t has elapsed after the energization to the motor 17 is started in S130. If the predetermined time t elapses, the transistor 53 is switched off while maintaining the transistor 51 at the on-state, thereby switching the ICR relay 27 to the contact side. Then, it is determined whether the engine 1 has reached the complete explosion state. If it is determined that the complete explosion state is reached, the transistors 51, 52 are switched off. Thus, the energization to the motor 17 is stopped and the pinion gear 21 is returned to the initial position where the pinion gear 21 is disengaged from the ring gear 25.

Further, in the normal start control processing, it is determined whether an energization time limitation flag mentioned later is ON (i.e., flag is set at 1). If the flag is ON, the energization time of the motor 17 is limited to a predetermined limit time. That is, if the energization time limitation flag is ON, the transistors 51, 52 are switched off when the limit time elapses after the energization to the motor 17 is started even if it is not determined that the engine 1 has reached the complete explosion state. Thus, the energization to the motor 17 is stopped and the pinion gear 21 is returned to the initial position.

If such the normal start control processing ends, the diagnostic processing at start timing also ends. The energization time limitation flag is set at ON if it is determined that a resistor side fixation abnormality exists in the ICR relay 27 in the processing of FIG. 7 explained later. If the motor 17 is energized for a long time when the resistor side fixation abnormality exists in the ICR relay 27, there is a possibility that the resistor 27*d* burns out. If the resistor 27*d* burns out, the engine start by energizing the motor 17 cannot be performed thereafter. Therefore, in the normal start control processing of S180, when the energization time limitation flag is set at ON, the energization time of the motor 17 is limited to the predetermined limit time or shorter to prevent the burning out of the resistor 27*d*. Therefore, the above-described limit time is set to a time shorter than an energization time, with which the resistor 27*d* burns out.

Figure 7:
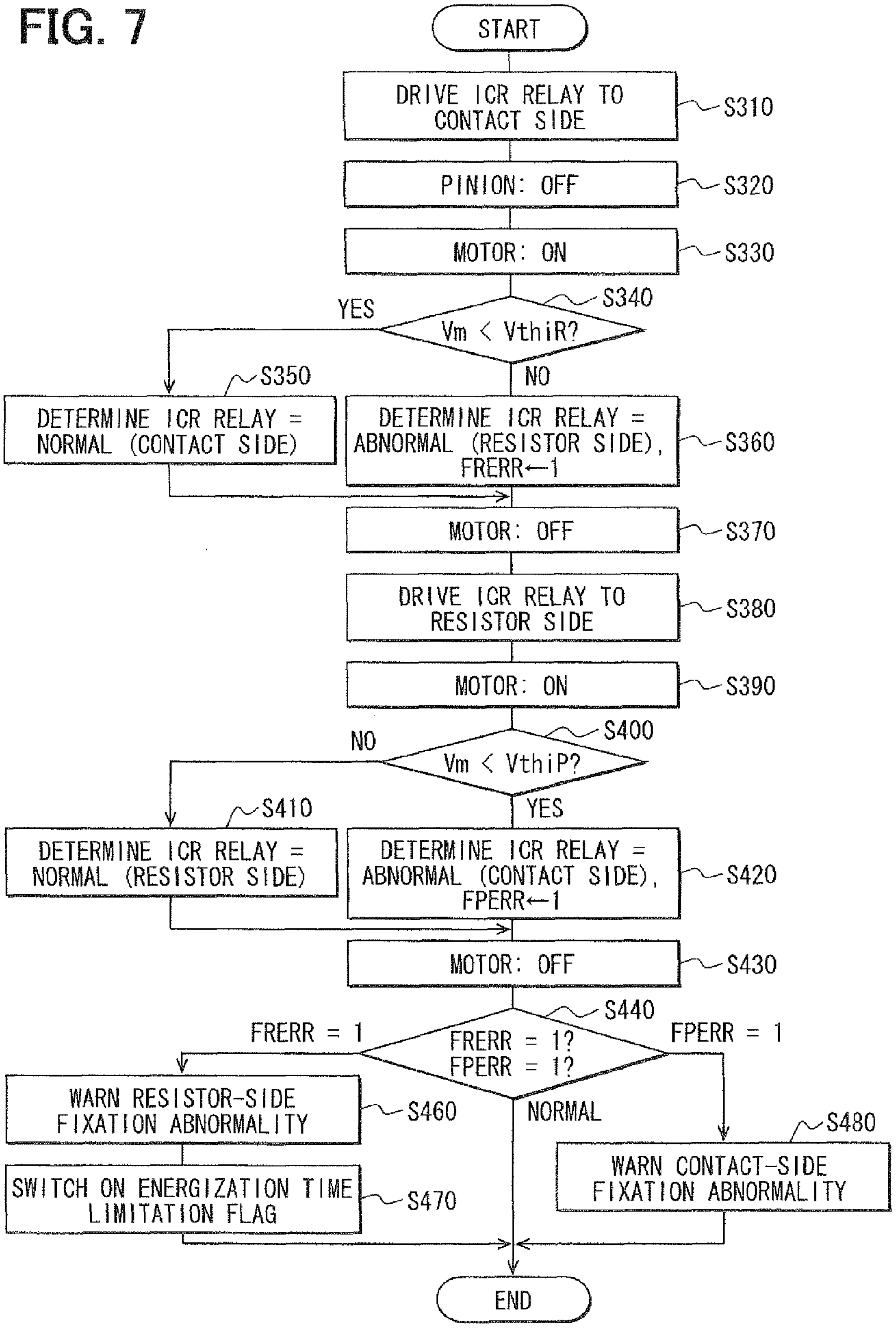
FIG. 7 is a flowchart showing diagnostic processing during engine operation according to the first embodiment.

FIG. 7 is a flowchart showing diagnostic processing during engine operation. The diagnostic processing during engine operation is performed at every constant time interval during the operation of the engine 1. If the microcomputer 41 starts the diagnostic processing during engine operation, the ICR relay 27 is driven to the contact side (i.e., coil 27*a* is deenergized) by maintaining the transistor 53 at the off-state in S310. In following S320, the pinion gear 21 is maintained at the initial position by maintaining the transistor 52 at the off-state. In following S330, the transistor 51 is switched on to bring the electromagnetic switch 19 to the on-state, thereby starting the energization to the motor 17. Thus, the current flows to the motor 17 without passing through the resistor 27*d* of the ICR relay 27, whereby the motor 17 rotates. However, since the pinion gear 21 is in the initial position, the engine 1 is not cranked. That is, the motor 17 is idled by driving the ICR relay 27 to the contact side. In the flowchart, "PINION: OFF" means placing the pinion gear 21 at the initial position.

In following S340, the minimum peak value of the monitor voltage Vm is sensed as in S140 of FIG. 6. It is determined whether the minimum peak value is lower than a determination value VthiR for resistor side fixation abnormality determination. If the minimum peak value of the monitor voltage Vm is lower than the determination value VthiR (i.e., if monitor voltage Vm becomes lower than determination value VthiR), it is determined in S350 that the ICR relay 27 is normal (i.e., ICR relay 27 is on contact side as driven), and the process proceeds to S370. The determination value VthiR is a voltage between the above mentioned 9.5 V and 6.5 V shown in FIG. 5. For example, the determination value VthiR is set at 7.7 V.

If it is determined that the minimum peak value of the monitor voltage Vm is not lower than the determination value VthiR in S340 (i.e., if monitor voltage Vm does not become lower than determination value VthiR), the process proceeds to S360. In S360, it is determined that the resistor side fixation abnormality has occurred in the ICR relay 27, and an error flag FRERR indicating the occurrence of the resistor side fixation abnormality is set at 1. Thereafter, the process proceeds to S370.

In S370, the transistor 51 is switched off to stop the energization to the motor 17 once. In the flowchart, "MOTOR: OFF" means switching off the transistor 51 to bring the electromagnetic switch 19 to the off-state (and also stopping energization to motor 17 in first embodiment).

In following S380, the transistor 53 is switched on to drive the ICR relay 27 to the resistor side (i.e., to energize coil 27*a*). In following S390, the transistor 51 is switched on to start the energization to the motor 17. Thus, this time, the current flows to the motor 17 through the resistor 27*d* of the ICR relay 27 and the motor 17 rotates. However, since the pinion gear 21 is in the initial position, the engine 1 is not cranked. That is, the motor 17 is idled by driving the ICR relay 27 to the resistor side.

In following S400, the minimum peak value of the monitor voltage Vm is sensed as in S140 of FIG. 6. It is determined whether the minimum peak value is lower than the determination value VthiP for the contact side fixation abnormality determination. If it is determined that the minimum peak value of the monitor voltage Vm is not lower than the determination value VthiP (i.e., if monitor voltage Vm does not become lower than determination value VthiP), it is determined that the ICR relay 27 is normal in S410 (i.e., ICR relay 27 is on resistor side as driven), and the process proceeds to S430.

In the present embodiment, the determination value VthiP used in S400 is set at the same value as the determination value VthiR (=7.7 V) used in S340 (refer to FIG. 5). The determination value VthiP used in S400 is set at a value larger than the determination value VthcP (=7.5 V) used in S140 of FIG. 6. That is, as mentioned above, the minimum peak value of the monitor voltage Vm in the case where the motor 17 is idled away is higher than the minimum peak value of the monitor voltage Vm in the case where the cranking is performed. Therefore, the determination value VthiP in the case where the motor 17 is idled away is set at a value slightly larger than the determination value VthcP in the case where the cranking is performed. In other words, the determination value VthcP in the case where the cranking is performed is set at a value smaller than the determination value VthiP in the case where the motor 17 is idled away. Alternatively, the determination value in the case where the motor 17 is idled away and the determination value in the case where the cranking is performed may be set at the same value.

If it is determined that the minimum peak value of the monitor voltage Vm is lower than the determination value VthiP in S400 (i.e., when monitor voltage Vm becomes lower than determination value VthiP), the process proceeds to S420. In S420, it is determined that the contact side fixation abnormality has occurred in the ICR relay 27, and the error flag FPERR indicating occurrence of the contact side fixation abnormality is set at 1. Then, the process proceeds to S430.

In S430, the transistor 51 is switched off to stop the energization to the motor 17. In following S440, the abnormality determination of the ICR relay 27 is performed. More specifically, both of the error flag FRERR and the error flag FPERR are referred to. If both of the error flags FRERR, FPERR are 0, the diagnostic processing during engine operation is ended as it is. If the error flag FRERR is 1, the process proceeds to S460, in which informing processing for informing the vehicle driver of the occurrence of the resistor side fixation abnormality is performed. Then in following S470, the above-mentioned energization time limitation flag is set at ON. Thereafter, the diagnostic processing during engine operation is ended.

As the informing processing in S460, the warning lamp (indicator) is lit, the buzzer is set off, or the message is displayed to urge the vehicle driver to go to the car dealer or the like, for example. Specifically, when the resistor side fixation abnormality occurs in the ICR relay 27, if the resistor 27*d* burns out due to the energization to the motor 17, the engine start becomes impossible. Therefore, as the informing processing in S460, a message (display or sound) for urging the vehicle driver to go to the car dealer or the like without stopping the engine 1 should be preferably given to the driver.

If the error flag FPERR is 1, the process proceeds to S480, in which the informing processing for informing the vehicle driver of the occurrence of the contact side fixation abnormality is performed. Then, the diagnostic processing during engine operation is ended. As the informing processing in S480, the warning lamp (indicator) is lit, the buzzer is set off, or the message is displayed to urge the vehicle driver to go to the car dealer or the like, for example.

With such the ECU 11, the resistor side fixation abnormality of the ICR relay 27 can be detected before the start of the engine 1 by the processing from S310 to S370 of FIG. 7 (corresponding to first state fixation abnormality detection processing at non-start timing) performed during the operation of the engine 1. Likewise, the contact side fixation abnormality of the ICR relay 27 can be detected before the start of the engine 1 by the processing of S320 and S380 to S430 of FIG. 7 (corresponding to second state fixation abnormality detection processing at non-start timing) performed during the operation of the engine 1.

The contact side fixation abnormality of the ICR relay 27 can be detected without energizing the motor 17 only for the abnormality detection by the processing from S140 to S160 of FIG. 6 (corresponding to second state fixation abnormality detection processing at start timing) performed during the start of the engine 1.

When either the contact side fixation abnormality or the resistor side fixation abnormality of the ICR relay 27 is detected, the occurrence of the abnormality is informed to the driver (S170, S460, S480). Therefore, early repair can be urged to the driver.

The energization time limitation flag is set at ON (S470) when it is determined that the resistor side fixation abnormality has occurred in the ICR relay 27 by the processing of S340 and S360 of FIG. 7 performed during the operation of the engine 1. Thus, the energization time of the motor 17 in the next engine start is limited to the predetermined limit time or shorter (S180). Thus, the burning out of the resistor 27*d* can be prevented.

The determination value VthcP in the case where the cranking is performed and the determination value VthiP in the case where the motor 17 is idled away are set at different values. The determination value in the former case is set at a smaller value than the determination value in the latter case. Thus, determination accuracy of the fixation abnormality in each case can be improved.

The fixation abnormality of the ICR relay 27 is detected based on the battery voltage VB, whose monitoring is necessary also in other control in the vehicle. Therefore, there is no need to newly add a circuit for monitoring a signal only for the fixation abnormality detection.

It is preferable to perform the diagnostic processing during engine operation when the vehicle speed is higher than 0. It is because the motor 17 is energized under the situation where there is essentially no need to energize the motor 17 and therefore the operation sound of the motor 17 should not be preferably audible to the occupant of the vehicle. If the vehicle speed is not zero, it is thought that the operation sound of the motor 17 is less audible because of the running sound of the vehicle. Therefore, it is desirable to perform the diagnostic processing under the situations where the sound is less distinguishable such as acceleration of the vehicle, deceleration of the vehicle and high-speed running of the vehicle.

When a device using a large energization current such as a defogger, a blower or a head lump is in operation, the diagnostic processing during engine operation may be suspended because the diagnostic processing further increases an electric load by rotating the motor 17.

In the present embodiment, the electromagnetic switch 19 corresponds to the switching section, and the ICR relay 27 corresponds to the inrush current suppressing section. The processing of S110, S130 and S180 of FIG. 6 corresponds to the start energization processing.

The processing from S140 to S160 of FIG. 6 and the processing from S310 to S440 of FIG. 7 correspond to the processing as the abnormality detection processing. As mentioned above, in the processing as the abnormality detection processing, the processing of S320 and S380 to S430 of FIG. 7 corresponds to the second state fixation abnormality detection processing at non-start timing, the processing from S140 to S160 of FIG. 6 corresponds to the second state fixation abnormality detection processing at start timing, and the processing from S310 to S370 of FIG. 7 corresponds to the first state fixation abnormality detection processing at non-start timing.

Each of the determination value VthiP in S400 and the determination value VthcP in S140 corresponds to the determination value of second state fixation. The determination value VthiP in S400 among them corresponds to the first determination value of second state fixation. The determination value VthcP in S140 corresponds to the second determination value of second state fixation. The determination value VthiR in S340 corresponds to the determination value of first state fixation.

The processing in S170 of FIG. 6 and the processing in S480 of FIG. 7 correspond to the first informing section. The processing in S460 of FIG. 7 corresponds to the second informing section.

Second Embodiment

Figure 8:
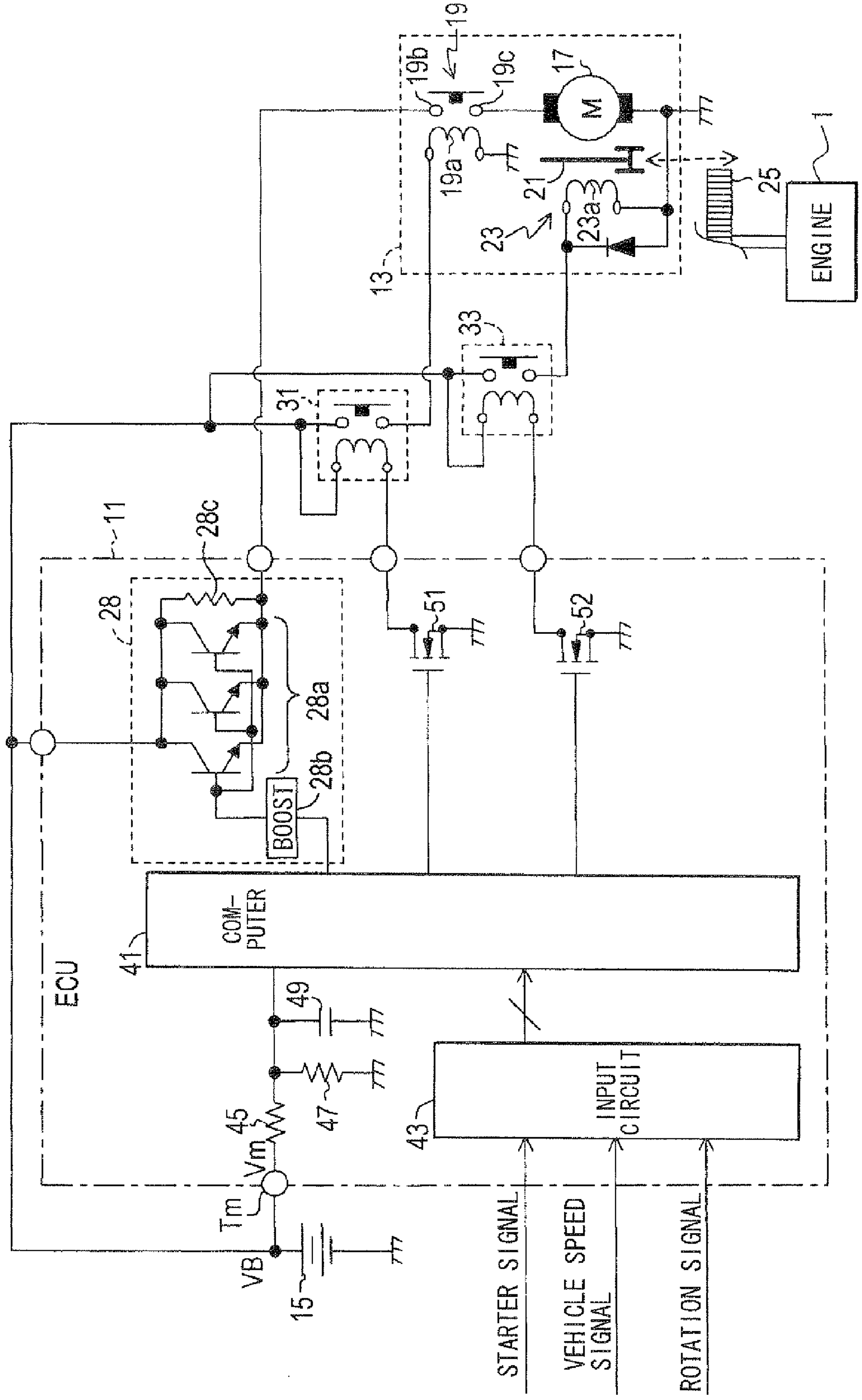
FIG. 8 is a diagram showing an ECU and its peripheral devices according to a second embodiment of the present invention.

Next, a second embodiment of the present invention will be explained. As shown in FIG. 8, in the second embodiment, the ICR relay 27 is not provided outside the ECU 11 unlike the first embodiment. Instead, an inrush current suppression circuit 28 that has the same function as the ICR relay 27 is provided inside the ECU 11.

The inrush current suppression circuit 28 has a transistor group 28*a* provided in series between the output terminal of the ECU 11 connected to the contact 19*b* of the electromagnetic switch 19 and the line of the battery voltage VB inside the ECU 11. The inrush current suppression circuit 28 further has a booster circuit 28*b* for switching on the transistor group 28*a* and a resistor 28*c* provided in parallel to the transistor group 28*a* between the output terminal of the ECU 11 and the line of the battery voltage VB inside the ECU 11.

The transistor group 28*a* consists of multiple transistors parallel to each other. In the present embodiment, each transistor is an IGBT, for example. The booster circuit 28*b* generates a high voltage higher than the battery voltage VB from the battery voltage VB. The booster circuit 28*b* supplies the high voltage to gates of the transistor group 28*a* according to a command from the microcomputer 41, thereby switching on the transistor group 28*a*.

Therefore, if the transistor group 28*a* is not switched on (i.e., is switched off), the inrush current suppression circuit 28 is brought to a first state, in which the resistor 28*c* is inserted into the power supply line extending to the motor 17 in series. If the transistor group 28*a* is switched on, the inrush current suppression circuit 28 is brought to a second state, in which the power supply line extending to the motor 17 is connected without inserting the resistor 28*c* into the power supply line.

Therefore, in the second embodiment, the ECU 11 does not have the transistor 53 for driving the ICR relay 27. The microcomputer 41 of the ECU 11 performs following processing in place of the processing of FIGS. 6 and 7 while modifying the processing of S110, S310, S380 of FIGS. 6 and 7.

That is, in S110 of FIG. 6 and S380 of FIG. 7, the transistor group 28*a* is switched off instead of driving the ICR relay 27 to the resistor side. In S310 of FIG. 7, the transistor group 28*a* is switched on instead of driving the ICR relay 27 to the contact side.

The second embodiment constructed in this way exerts the same effects as the effects of the first embodiment. A switching element different from the IGBT may be used as the transistor constituting the transistor group 28*a*. For example, FET or a bipolar transistor may be used. Instead of the transistor group 28*a*, a single transistor (switching element) may be used as long as a large current can be passed to the motor 17.

Third Embodiment

Figure 9:
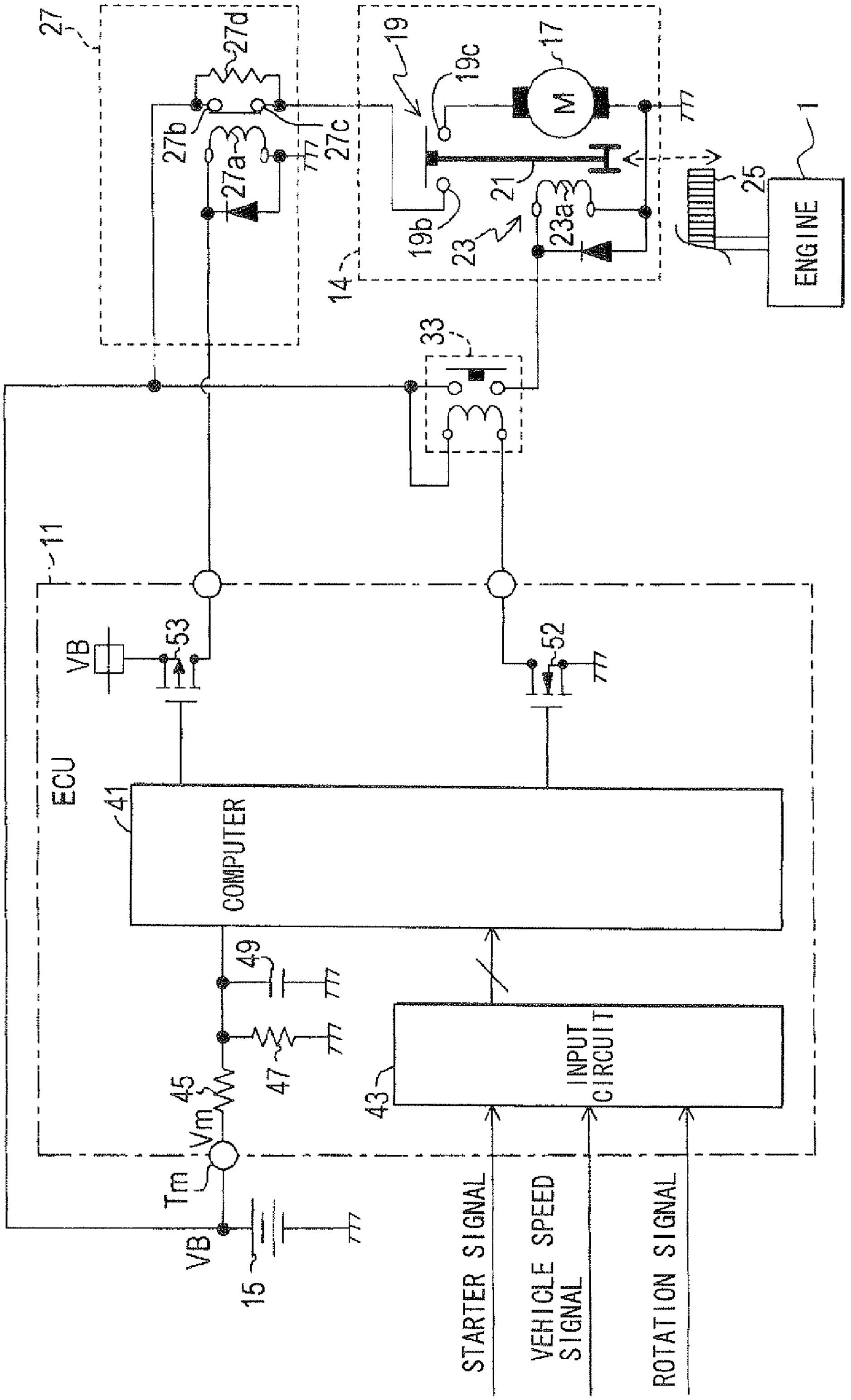
FIG. 9 is a diagram showing an ECU and its peripheral devices according to a third embodiment of the present invention.

Next, a third embodiment of the present invention will be described. As shown in FIG. 9, in the third embodiment, a starter 14 is used in place of the starter 13 of the first embodiment. The starter 14 is constructed such that the action for engaging the pinion gear 21 with the ring gear 25 and the energization to the motor 17 are performed in conjunction with each other.

More specifically, if the coil 23*a* of the pinion actuation solenoid 23 of the starter 14 is energized, the pinion gear 21 protrudes and engages with the ring gear 25. In addition, due to an electromagnetic force caused by the energization to the coil 23*a*, the contacts 19*b*, 19*c* of the electromagnetic switch 19 short-circuit to connect the power supply line extending to the motor 17.

Therefore, the electromagnetic switch 19 of the starter 14 does not have the coil 19*a* used in the first embodiment. The ECU 11 does not have the transistor 51 for driving only the electromagnetic switch 19. That is, in the starter 14, the coil 23*a* of the pinion actuation solenoid 23 functions also as the coil for switching on the electromagnetic switch 19.

Instead of the processing of FIG. 6, the microcomputer 41 of the ECU 11 performs the processing of FIG. 6, from which S130 is removed. It is because also the electromagnetic switch 19 is switched on and off by the on and off of the transistor 52 that operates the pinion gear 21.

Since such the starter 14 is used in the third embodiment, the microcomputer 41 does not perform the diagnostic processing of FIG. 7 during the operation of the engine 1. The ECU 11 according to the third embodiment exerts the same effects as the first embodiment except that the ECU 11 of the third embodiment cannot detect the abnormality of the ICR relay 27 during the operation of the engine 1.

Fourth Embodiment

Figure 10:
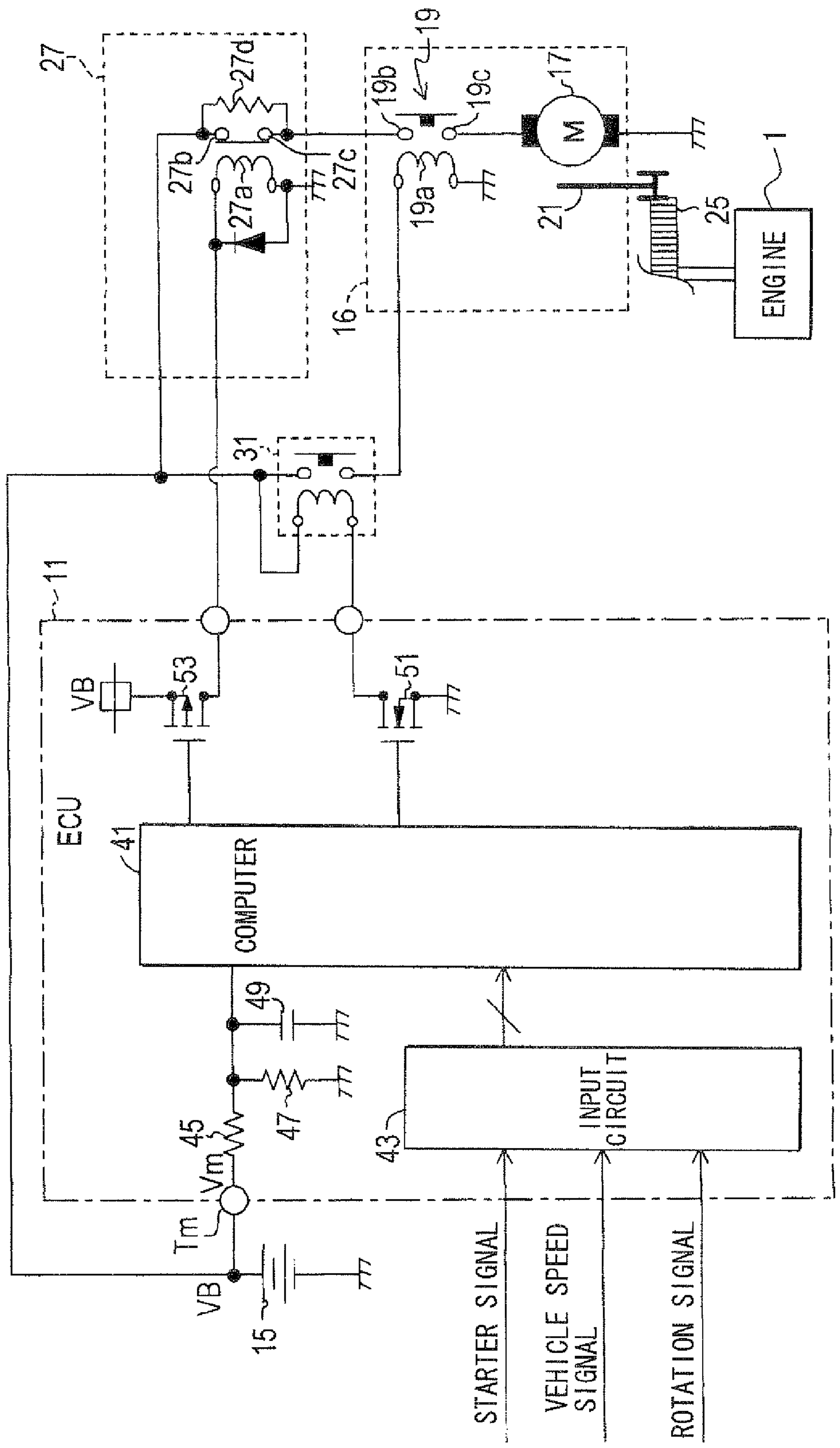
FIG. 10 is a diagram showing an ECU and its peripheral devices according to a fourth embodiment of the present invention.

Next, a fourth embodiment of the present invention will be described. As shown in FIG. 10, in the fourth embodiment, a starter 16 is used in place of the starter 13 used in the first embodiment. The starter 16 is structured such that the pinion gear 21 invariably engages with the ring gear 25.

Therefore, the starter 16 does not have the pinion actuation solenoid 23. The ECU 11 does not have the transistor 52 for driving the pinion actuation solenoid 23. In the starter 16, a well-known one-way clutch is provided between the pinion gear 21 and a rotary shaft of the motor 17. When the pinion gear 21 is rotated not by the motor 17 but by the ring gear 25 (i.e., when motor 17 is deenergized), the one-way clutch prevents the motor 17 from being rotated by a rotational force from the ring gear 25.

Instead of the processing of FIG. 6, the microcomputer 41 of the ECU 11 performs the processing of FIG. 6, from which S120 is removed. It is because the processing for controlling the pinion gear 21 of the starter 16 is unnecessary.

Since the above-mentioned starter 16 is used in the fourth embodiment, the microcomputer 41 does not perform the diagnostic processing of FIG. 7 during the operation of the engine 1. Like the third embodiment, the ECU 11 according to the fourth embodiment exerts the same effects as the first embodiment except that the ECU 11 of the fourth embodiment cannot detect the abnormality of the ICR relay 27 during the operation of the engine 1.

Fifth Embodiment

Figure 11:
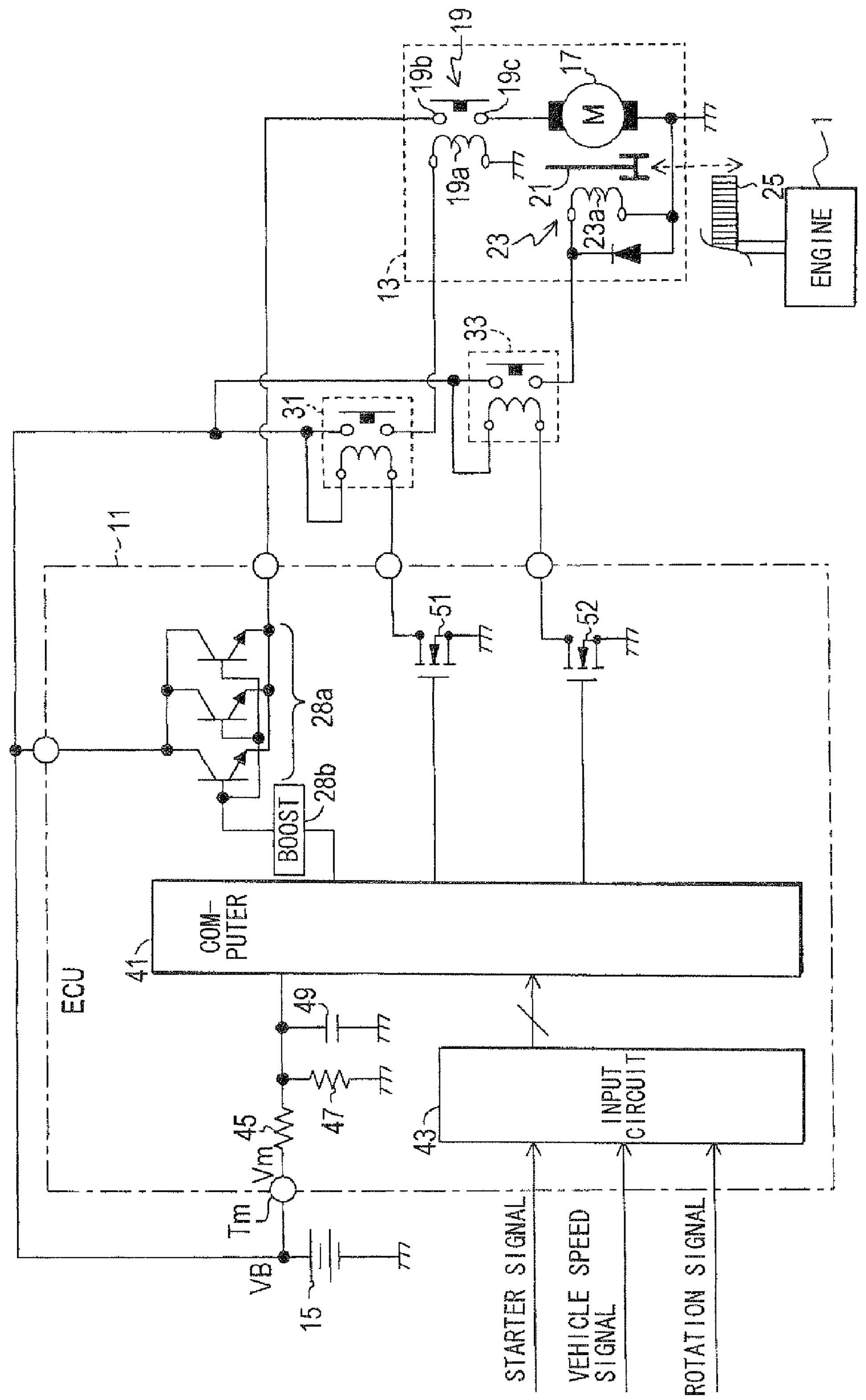
FIG. 11 is a diagram showing an ECU and its peripheral devices according to a fifth embodiment of the present invention.

Next, a fifth embodiment of the present invention will be described. As shown in FIG. 11, in the fifth embodiment, the ICR relay 27 is not provided outside the ECU 11 unlike the first embodiment. A transistor group 28*a* that has the same function as the ICR relay 27 is provided inside the ECU 11.

The transistor group 28*a* consists of multiple transistors parallel to each other. For example, the transistor is an IGBT in the present embodiment. The transistor group 28*a* is provided in series between the output terminal of the ECU 11 connected to the contact 19*b* of the electromagnetic switch 19 and the line of the battery voltage VB inside the ECU 11.

The ECU 11 further has a booster circuit 28*b* for switching on the transistor group 28*a*. The booster circuit 28*b* generates a high voltage higher than the battery voltage VB from the battery voltage VB. The booster circuit 28*b* supplies the high voltage to gates of the transistor group 28*a* according to a command from the microcomputer 41, thereby switching on the transistor group 28*a*. Therefore, the ECU 11 does not have the transistor 53 for driving the ICR relay 27.

That is, the transistor group 28*a* and the booster circuit 28*b* according to the present embodiment are the same as the transistor group 28*a* and the booster circuit 28*b* of FIG. 8 mentioned above. However, the resistor 28*c* shown in FIG. 8 is not used in the fifth embodiment.

In the fifth embodiment, if the microcomputer 41 performs drive of switching control for switching the transistor group 28*a* between on and off, the transistor group 28*a* is brought to a first state for suppressing the energization current passed to the motor 17. If the microcomputer 41 performs drive for maintaining the on-state of the transistor group 28*a* (i.e., for maintaining transistor group 28*a* at on-state), the transistor group 28*a* is brought to a second state, in which the energization current passed to the motor 17 is not suppressed.

That is, performing the switching control of the transistor group 28*a* in the fifth embodiment corresponds to bringing the ICR relay 27 to the resistor side in the first embodiment. Maintaining the transistor group 28*a* in the on-state in the fifth embodiment corresponds to bringing the ICR relay 27 to the contact side in the first embodiment.

Figure 12:
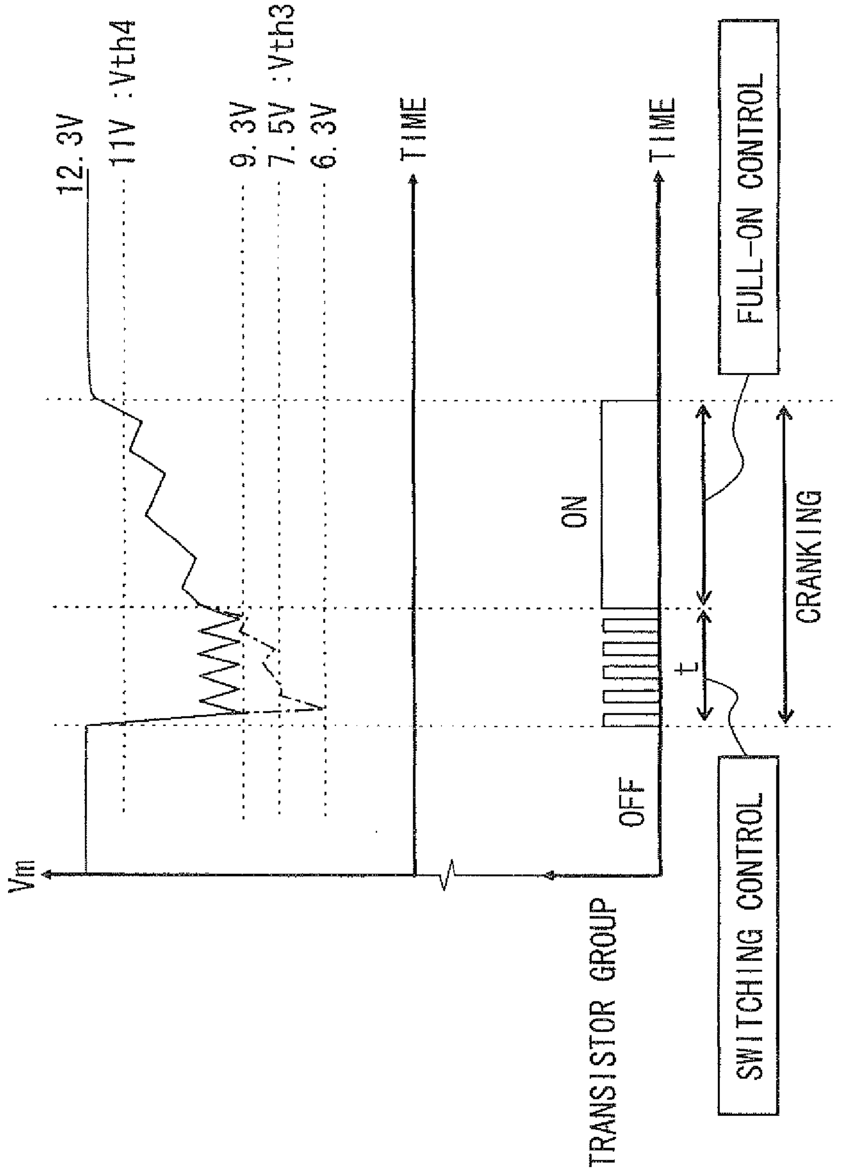
FIG. 12 is a diagram illustrating an abnormality detection principle of a transistor group according to the fifth embodiment.

Therefore, the microcomputer 41 suppresses the inrush current flowing to the motor 17 by performing the switching control of the transistor group 28*a* until a predetermined time t elapses after the energization to the motor 17 is started (i.e., after electromagnetic switch 19 is switched on) in the engine start as shown in a lower part of FIG. 12. The microcomputer 41 removes the suppression of the energization current passed to the motor 17 by keeping the transistor group 28*a* in the on-state from the timing when the predetermined time t elapses to an end timing of the energization to the motor 17. "FULL-ON CONTROL" in FIG. 12 and in following description means control for keeping the transistor group 28*a* in the on-state.

A solid line in an upper part of FIG. 12 shows a waveform of the monitor voltage Vm (=battery voltage VB) in the engine start. The solid line shows the waveform of the monitor voltage Vm in the case where the electromagnetic switch 19 is switched on and the transistor group 28*a* is controlled as shown in the lower part of FIG. 12 while the pinion gear 21 is engaged with the ring gear 25. A chained line in the upper part of FIG. 12 shows a waveform of the monitor voltage Vm in the case where the cranking is performed while maintaining the transistor group 28*a* in the on-state. The chained line shows the waveform of the monitor voltage Vm in the case where the electromagnetic switch 19 is switched on and the full-on control of the transistor group 28*a* is performed from the beginning of the energization of the motor 17 while the pinion gear 21 is engaged with the ring gear 25.

As understood from FIG. 12, also in the fifth embodiment, the minimum peak value of the monitor voltage Vm in the case where the current passed to the motor 17 is not suppressed as shown by the chained line becomes lower than in the case where the current is suppressed as shown by the solid line like the first embodiment.

For example, in the example of FIG. 12, while the minimum peak value of the monitor voltage Vm shown by the solid line is 9.3 V, the minimum peak value of the monitor voltage Vm shown by the chained line is 6.3 V. By the voltage difference, it can be determined whether the switching control of the transistor group 28*a* is performed or the transistor group 28*a* is continuously in the on-state.

If the monitor voltage Vm does not become lower than a predetermined determination value (for example, Vth4 in FIG. 12=11 V) although the electromagnetic switch 19 is switched on and the switching control or the full-on control of the transistor group 28*a* is performed, it can be determined that the current does not flow to the motor 17 and a fixation abnormality in the off-state, in which the transistor group 28*a* cannot be switched on, has occurred in the transistor group 28*a*.

Figure 13:
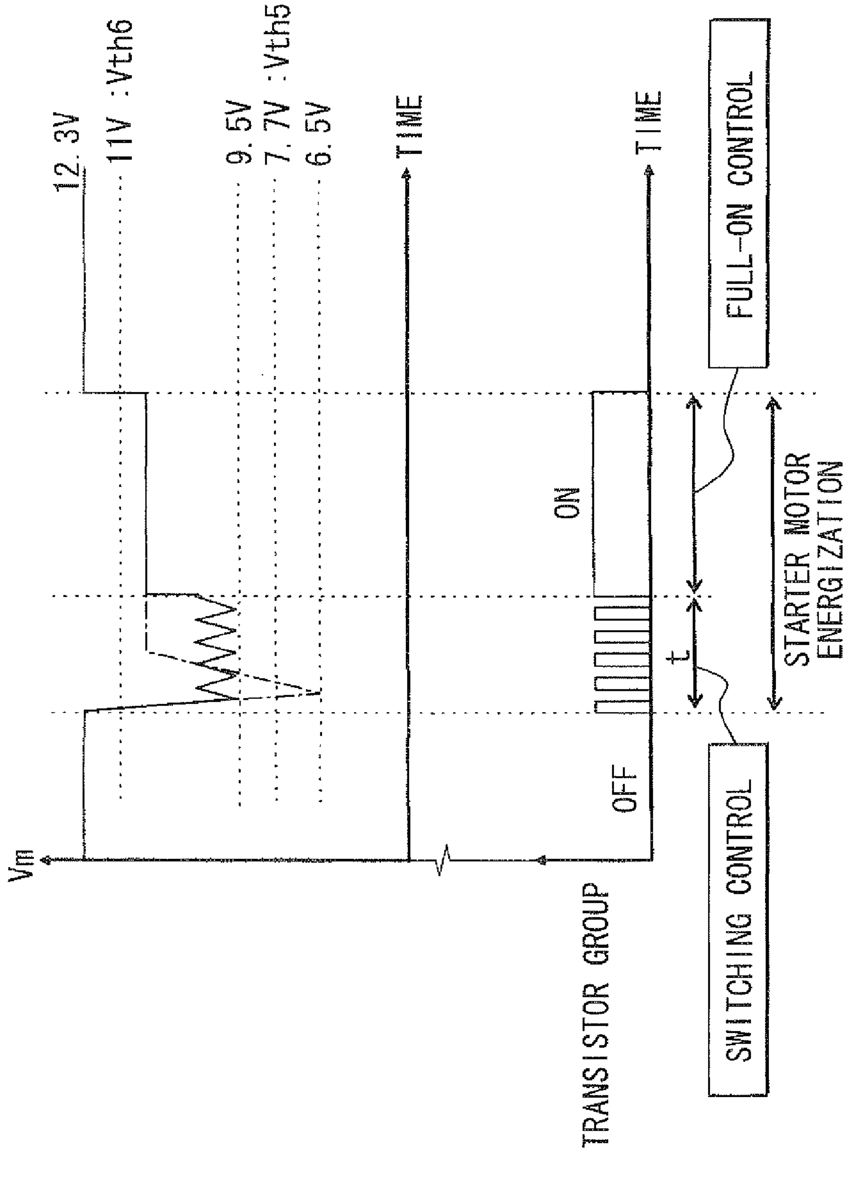
FIG. 13 is another diagram illustrating the abnormality detection principle of the transistor group according to the fifth embodiment.

A solid line in an upper part of FIG. 13 shows a waveform of the monitor voltage Vm in the case where the electromagnetic switch 19 and the transistor group 28*a* are controlled in the same way as the case of the solid line in the upper part of FIG. 12 while the pinion gear 21 is disengaged from the ring gear 25. A chained line in the upper part of FIG. 13 shows a waveform of the monitor voltage Vm in the case where the electromagnetic switch 19 and the transistor group 28*a* are controlled in the same way as the case of the chained line in the upper part of FIG. 12 while the pinion gear 21 is disengaged from the ring gear 25.

As understood from FIG. 13, when only the energization to the motor 17 is performed without causing the starter 13 to crank the engine 1 (i.e., when motor 17 is idled away), the motor current decreases by the decrease in the rotation load of the motor 17. Therefore, the monitor voltage Vm at the time when the motor 17 is energized becomes slightly higher than in the case of FIG. 12, in which the cranking is performed.

Accordingly, in the fifth embodiment, the abnormality of the transistor group 28 is detected by processing substantially similar to the first embodiment.

Next, concrete contents of diagnostic processing performed by the microcomputer 41 according to the fifth embodiment will be explained with reference to flowcharts shown in FIGS. 14 and 15.

Figure 14:
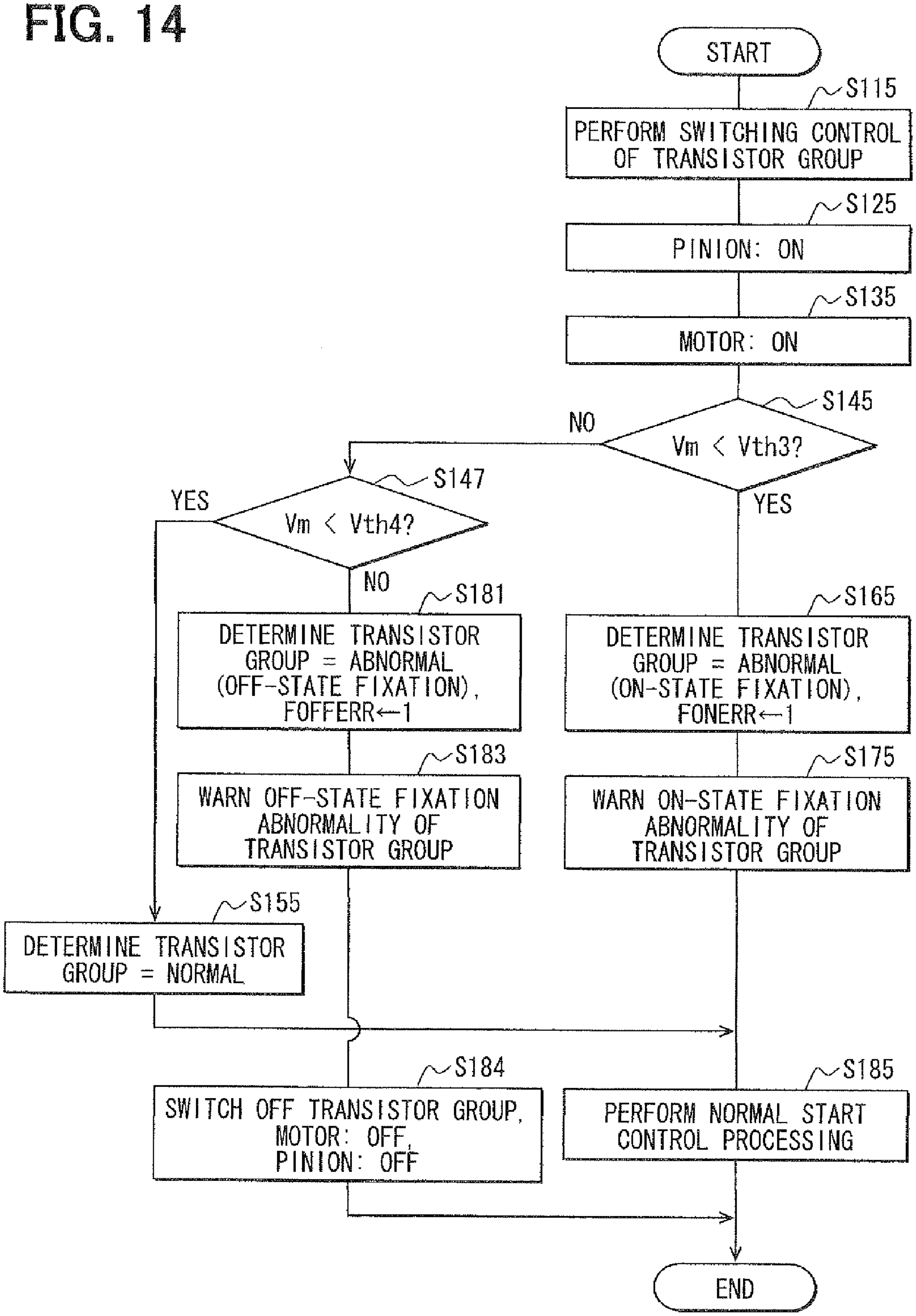
FIG. 14 is a flowchart showing diagnostic processing at start timing according to the fifth embodiment.

FIG. 14 is a flowchart showing diagnostic processing at start timing replacing the processing of FIG. 6. Also the diagnostic processing at start timing shown in FIG. 14 is started when the starter signal becomes the active level in the start of the engine 1.

As shown in FIG. 14, if the microcomputer 41 starts the diagnostic processing at start timing, the switching control of the transistor group 28*a* is performed in S115 first. In following S125, the transistor 52 is switched on to engage the pinion gear 21 with the ring gear 25. In following S135, the transistor 51 is switched on to bring the electromagnetic switch 19 to the on-state, thereby starting the energization to the motor 17. Thus, the cranking of the engine 1 is started while the inrush current to the motor 17 is suppressed.

In following S145, the minimum peak value of the monitor voltage Vm is sensed by performing the A/D conversion of the monitor voltage Vm multiple times at predetermined short intervals. It is determined whether the minimum peak value is lower than a predetermined determination value Vth3 for on-state fixation abnormality determination. If it is determined that the minimum peak value of the monitor voltage Vm is not lower than the determination value Vth3 (i.e., when monitor voltage Vm does not become lower than determination value Vth3), the process proceeds to S147.

In S145, the A/D conversion of the monitor voltage Vm may be performed once when a time, by which the battery voltage VB is anticipated to minimize, passes from the start of the energization to the motor 17, and the A/D conversion value may be used as the minimum peak value of the monitor voltage Vm.

The determination value Vth 3 is set at a value explained below. That is, a normal value of the minimum peak value of the monitor voltage Vm (9.3 V in example of FIG. 12) in the case where the engine 1 is cranked by performing the switching control of the transistor group 28*a* in the start of the energization of the motor 17 may be defined as Vq1. A normal value of the minimum peak value of the monitor voltage Vm (6.3 V in example of FIG. 12) in the case where the engine 1 is cranked by performing the full-on control of the transistor group 28*a* in the start of the energization of the motor 17 may be defined as Vq2. In this case, the determination value Vth3 is set between the values Vq1, Vq2. The determination value Vth3 is set at 7.5 V, for example.

In S147 proceeded from S145, it is determined whether the minimum peak value of the monitor voltage Vm is lower than a determination value Vth4 for off-state fixation abnormality determination set at a higher value than the above-mentioned determination value Vth3. If the minimum peak value of the monitor voltage Vm is lower than the determination value Vth4 (i.e., if minimum peak value of monitor voltage Vm is between Vth3 and Vth4), it is determined in S155 that the transistor group 28*a* is normal, and the process proceeds to S185.

The determination value Vth4 is set at a value slightly lower than the battery voltage VB and is set at 11 V, for example. If it is determined in S145 that the minimum peak value of the monitor voltage Vm is lower than the determination value Vth3 (i.e., when monitor voltage Vm becomes lower than determination value Vth3), the process proceeds to S165, in which it is determined that the on-state fixation abnormality, in which the transistor group 28*a* remains in the on-state, has occurred in the transistor group 28*a*. In this case, an error flag FONERR indicating the occurrence of the on-state fixation abnormality is set at 1. In following S175, informing processing for informing the vehicle driver of the occurrence of the on-state fixation abnormality of the transistor group 28*a* is performed. Then, the process proceeds to S185. As the informing processing in S175, the warning lamp (indicator) is lit, the buzzer is set off, or the message is displayed to urge the vehicle driver to go to the car dealer or the like, for example.

In S185, the normal start control processing for engine start is performed. The normal start control processing is remaining processing for realizing the starter control contents in the engine start together with the processing from S115 to S135. In S185, first, it is determined whether the above-mentioned predetermined time t has elapsed after the energization to the motor 17 is started in S135. If the predetermined time t elapses, the transistor group 28*a* is switched to the full-on control while maintaining the transistor 51 at the on-state. Then, it is determined whether the engine 1 has reached the complete explosion state. If it is determined that the complete explosion state has been reached, the transistor group 28*a* and the transistors 51, 52 are switched off. Thus, the energization to the motor 17 is stopped and the pinion gear 21 is returned to the initial position where the pinion gear 21 is disengaged from the ring gear 25. When such the normal start control ends, the diagnostic processing at start timing also ends.

If it is determined in S147 that the minimum peak value of the monitor voltage Vm is not lower than the determination value Vth4 (i.e., when monitor voltage Vm does not become lower than determination value Vth4), it is though that the transistor group 28*a* is not switched on. Therefore, in this case, the process proceeds to S181, in which it is determined that the off-state fixation abnormality (fixation abnormality in which transistor group 28*a* remains in off-state) has occurred in the transistor group 28*a* and an error flag FOFFERR is set at 1.

In following S183, informing processing for informing the vehicle driver of the occurrence of the off-state fixation abnormality of the transistor group 28*a* is performed. Then, the process proceeds to S184. For example, as the informing processing of S183, the warning lamp (indicator) is lit, the buzzer is set off, or the message is displayed to notify the vehicle driver that the engine 1 cannot be started or that repair is necessary.

In S184 after such the informing processing is performed, processing for switching off the transistor group 28*a* is performed just in case. Further, the transistor 51 is switched off to bring the electromagnetic switch 19 to the off-state, and the transistor 52 is switched off to return the pinion gear 21 to the initial position. Then, the diagnostic processing at start timing is ended.

Figure 15:
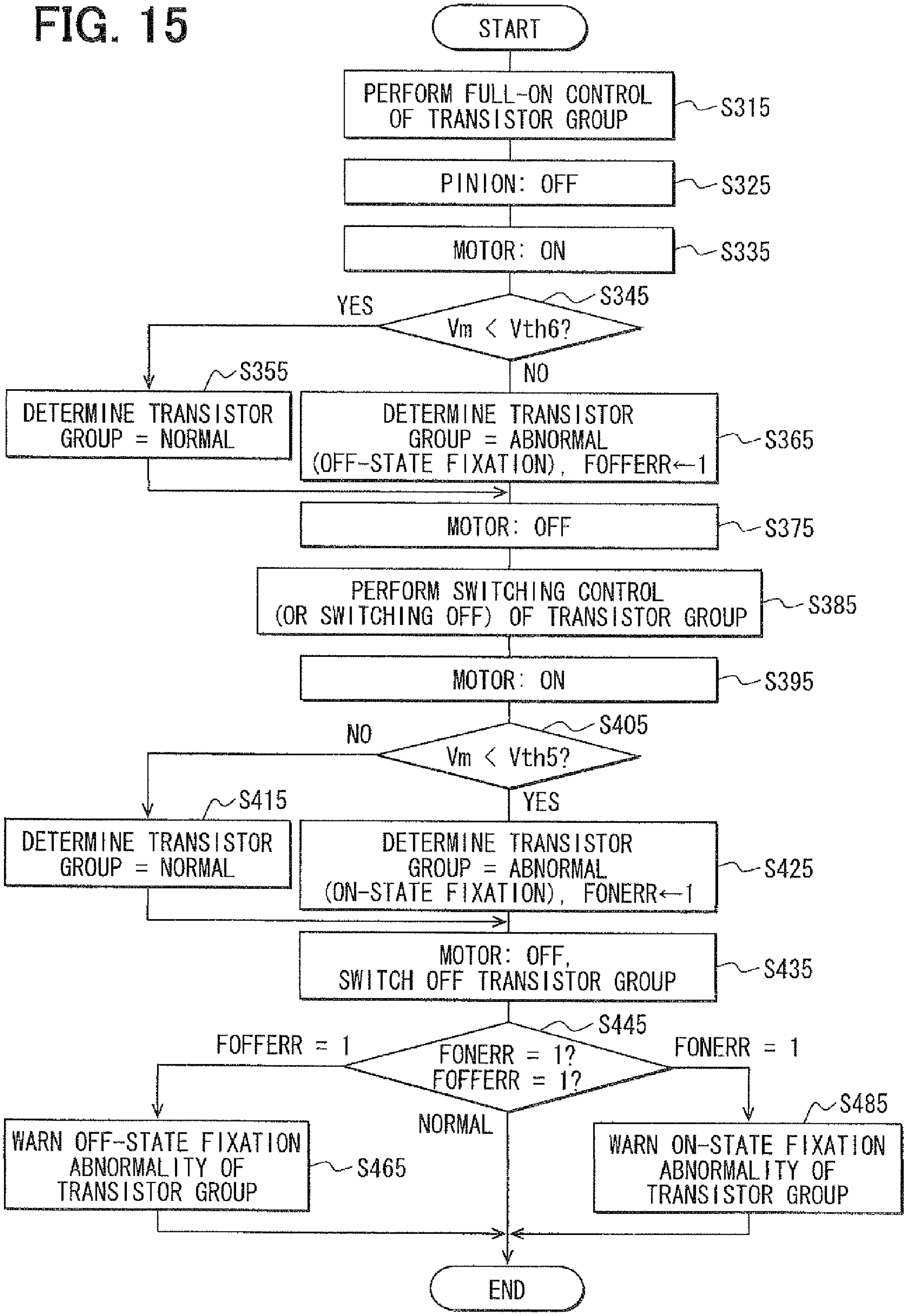
FIG. 15 is a flowchart showing diagnostic processing during engine operation according to the fifth embodiment.

FIG. 15 is a flowchart showing diagnostic processing during engine operation replacing the processing shown in FIG. 7. The diagnostic processing during engine operation shown in FIG. 15 is performed during the operation of the engine 1 at every constant time interval, for example.

As shown in FIG. 15, if the microcomputer 41 starts the diagnostic processing during engine operation, the full-on control of the transistor group 28*a* is performed in S315 first. In following S325, the transistor 52 is maintained in the off-state to maintain the pinion gear 21 at the initial position. In following S335, the transistor 51 is switched on to bring the electromagnetic switch 19 to the on-state, thereby starting the energization to the motor 17. Thus, the motor 17 rotates. However, since the pinion gear 21 is at the initial position, the engine 1 is not cranked. That is, the motor 17 is idled away by setting the transistor group 28*a* in the on-state.

Then, in following S345, the minimum peak value of the monitor voltage Vm is sensed as in S145 of FIG. 14 and it is determined whether the minimum peak value is lower than a determination value Vth6 for off-state fixation abnormality determination. If it is determined that the minimum peak value of the monitor voltage Vm is lower than the determination value Vth6 (i.e., when monitor voltage Vm becomes lower than determination value Vth6), it is determined that the transistor group 28*a* is normal in S355, and the process proceeds to S375.

The determination value Vth6 is a value slightly lower than the battery voltage VB as shown in FIG. 13. For example, the determination value Vth6 is set at 11 V like the above-mentioned determination value Vth4. The minimum peak value (9.5 V in example of FIG. 13) of the monitor voltage Vm shown by a solid line in an upper part of FIG. 13 may be defined as Vr1. The minimum peak value (6.5 V in example of FIG. 13) of the monitor voltage Vm shown by a chained line in the upper part of FIG. 13 may be defined as Vr2. In this case, a determination value Vth5 set between Vr1 and Vr2 may be used in S345 instead of the determination value Vth6, for example. The determination value Vth5 is slightly higher than the above-mentioned determination value Vth3 and is 7.7 V in the example of FIG. 13.

When it is determined that the minimum peak value of the monitor voltage Vm is not lower than the determination value Vth6 (or Vth5) in S345 (i.e., when monitor voltage Vm does not become lower than determination value), it is thought that the transistor group 28*a* is not switched on. Therefore, in this case, the process proceeds to S365, in which it is determined that the off-state fixation abnormality has occurred in the transistor group 28*a*. The error flag FOFFERR indicating the occurrence of the off-state fixation abnormality is set at 1, and the process proceeds to S375.

In S375, the transistor 51 is switched off to switch off the electromagnetic switch 19 once. That is, the energization to the motor 17 is suspended once. In following S385, the switching control of the transistor group 28*a* is performed. In following S395, the transistor 51 is switched on to start the energization to the motor 17. That is, the motor 17 is idled away by performing the switching control of the transistor group 28*a*.

In following S405, the minimum peak value of the monitor voltage Vm is sensed as in S145 of FIG. 14 and it is determined whether the minimum peak value is lower than the determination value Vth5. If the minimum peak value of the monitor voltage Vm is not lower than the determination value Vth5 (i.e., if monitor voltage Vm does not become lower than determination value Vth5), it is determined in S415 that the transistor group 28*a* is normal, and the process proceeds to S435.

If it is determined that the minimum peak value of the monitor voltage Vm is lower than the determination value Vth5 in S405 (i.e., when monitor voltage Vm becomes lower than determination value Vth5), the process proceeds to S425. In S425, it is determined that the on-state fixation abnormality has occurred in the transistor group 28*a*. The error flag FONERR indicating the occurrence of the on-state fixation abnormality is set at 1, and the process proceeds to S435.

In S385, instead of performing the switching control of the transistor group 28*a*, the transistor group 28*a* may be switched off. Also in this case, the on-state fixation abnormality of the transistor group 28*a* can be detected by the determination of S405.

In S435, the transistor 51 is switched off to switch off the electromagnetic switch 19, and also the transistor group 28*a* is switched off. In following S445, the abnormality determination of the transistor group 28*a* is performed. More specifically, both of the error flag FOFFERR and the error flag FONERR are referred to. If both of the error flags FOFFERR, FONERR are 0, the diagnostic processing during engine operation is ended as it is. If the error flag FOFFERR is 1, the process proceeds to S465, in which the informing processing like S183 of FIG. 14 is performed. Then, the diagnostic processing during engine operation is ended.

In S465 of the diagnostic processing during engine operation, it is desirable to provide the vehicle driver with a message (display, sound or the like) for urging the vehicle driver to go to the car dealer or the like without stopping the engine 1. It is because the engine 1 cannot be started with the starter 13 when the off-state fixation abnormality exists in the transistor group 28*a*.

If the error flag FONERR is 1, the process proceeds to S485, in which the informing processing like S175 of FIG. 14 is performed. Then, the diagnostic processing during engine operation is ended.

With the above-described ECU 11 according to the fifth embodiment, the off-state fixation abnormality and the on-state fixation abnormality of the transistor group 28*a* can be detected distinctly from each other before the start of the engine 1 by the processing of FIG. 15 performed during the operation of the engine 1.

By the processing of FIG. 14 performed in the start of the engine 1, the on-state fixation abnormality and the off-state fixation abnormality of the transistor group 28*a* can be detected without energizing the motor 17 only for the abnormality detection.

When either one of the fixation abnormalities of the transistor group 28*a* is detected, the occurrence of the abnormality is informed to the vehicle driver (S175, S183, S465, S485). Therefore, early repair can be urged to the vehicle driver.

As for the determination values Vth3, Vth5 for detecting the on-state fixation abnormality, the determination value Vth3 in the case where the cranking is performed and the determination value Vth5 in the case where the motor 17 is idled away are set at the different values. The determination value Vth3 in the former case is set at the smaller value than the determination value Vth5 in the latter case. Therefore, the determination accuracy of the on-state fixation abnormality can be improved in the respective cases.

The fixation abnormality of the transistor group 28*a* is detected based on the battery voltage VB, monitoring of which is necessary for performing other control in the vehicle. Therefore, there is no need to newly add a circuit for monitoring a signal only for the abnormality detection.

The processing of FIG. 15 should be preferably performed when the vehicle speed is higher than 0 like the processing of FIG. 7.

In the fifth embodiment, the transistor group 28*a* corresponds to the switching element as the inrush current suppressing section. The processing of S115, S135 and S185 of FIG. 14 corresponds to the start energization processing.

The processing of S145 to S165 and S181 of FIG. 14 and the processing of S315 to S445 of FIG. 15 correspond to the processing as the abnormality detecting section. In the processing as the abnormality detecting section, the processing of S325 and S385 to S435 of FIG. 15 corresponds to the on-state fixation abnormality detection processing at non-start timing, the processing of S145 and S165 of FIG. 14 corresponds to the on-state fixation abnormality detection processing at start timing, and the processing of S315 to S375 of FIG. 15 corresponds to the off-state fixation abnormality detection processing at non-start timing.

Each of the determination value Vth5 of S405 and the determination value Vth3 of S145 corresponds to the determination value of on-state fixation. Among them, the determination value Vth5 of S405 corresponds to the first determination value of on-state fixation, and the determination value Vth3 of S145 corresponds to the second determination value of on-state fixation. Each of the determination value Vth6 (or Vth5) in S345 and the determination value Vth4 in S147 corresponds to the determination value of off-state fixation.

The processing of S175 of FIG. 14 and the processing of S485 of FIG. 15 correspond to the first informing section. The processing of S183 of FIG. 14 and the processing of S465 of FIG. 15 correspond to the second informing section. The determination values Vth4, Vth6 for detecting the off-state fixation abnormality of the transistor group 28*a* may be set at voltage(s) lower than a voltage level, to which the voltage falls when an electric load other than the starter motor 17 actuates, and higher than the determination values Vth3, Vth5 for detecting the on-state fixation abnormality. With such the setting, the off-state fixation abnormality of the transistor group 28*a* can be detected correctly even if the battery voltage VB falls due to the actuation of the electric load other than starter motor 17.

The determination values Vth4, Vth6 may be set variably according to the states of the battery 15, the electric load and the like. Similarly, also the determination values Vth3, Vth5 may be set variably according to the state of the battery 15, a suppression amount of the inrush current flowing to the motor 17, temperature of the engine 1 or the starter 13 (or motor 17), viscosity or temperature of engine oil, an engine load and the like. The determination values Vth3, Vth5 may be the same value.

Sixth Embodiment

Next, a sixth embodiment of the present invention will be described. The sixth embodiment is different from the fifth embodiment in that the microcomputer 41 of the ECU 11 according to the sixth embodiment performs processing of FIG. 16 in place of the processing of FIG. 15 (diagnostic processing during engine operation).

Figure 16:
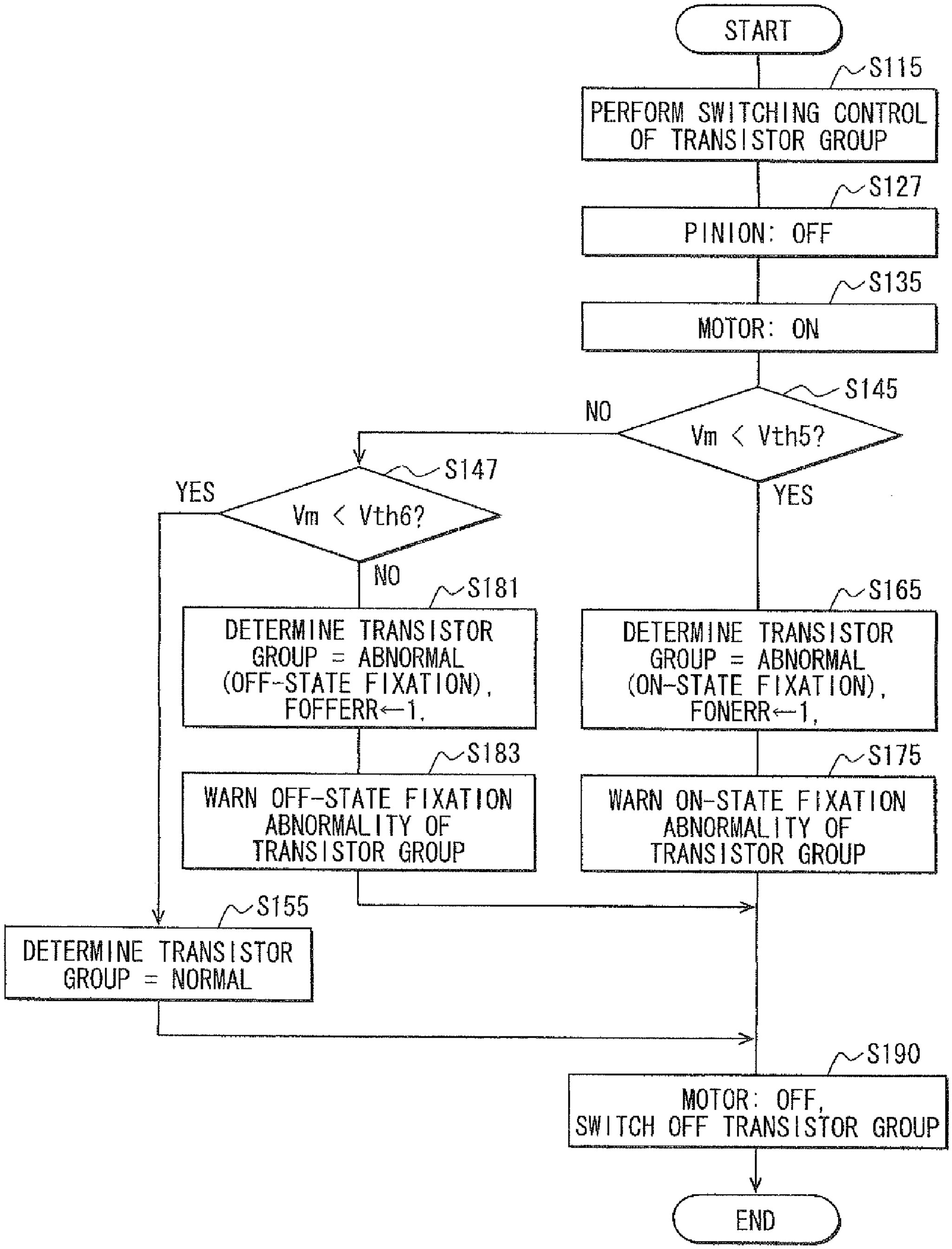
FIG. 16 is a flowchart showing diagnostic processing during engine operation according to a sixth embodiment of the present invention.

The processing of FIG. 16 differs from the diagnostic processing at start timing shown in FIG. 14 in following points. Firstly, in S127 replacing S125, the transistor 52 is switched off to disengage the pinion gear 21 from the ring gear 25. Thus, the cranking of the engine 1 is prevented.

The process proceeds to S190 from each of S155, S175 and S183. The diagnosis has ended as of S190. Therefore, the transistor 51 is switched off to switch off the electromagnetic switch 19, and also the transistor group 28*a* is switched off.

The motor 17 is idled away in the processing of FIG. 16. Therefore, in the determination of S145, the determination value Vth5 in the case of idling the motor 17 (refer to FIG. 13) is used in place of the determination value Vth3 (refer to FIG. 12) in the case of performing the cranking. In the determination of S147, the determination value Vth6 (refer to FIG. 13) in the case of idling the motor 17 is used in place of the determination value Vth4 (refer to FIG. 12) in the case of performing the cranking. However, since Vth4=Vth6 in the examples of FIGS. 12 and 13, S147 is substantially the same between FIGS. 14 and 16.

Also by performing the processing of FIG. 16 as the diagnostic processing during engine operation, the off-state fixation abnormality and the on-state fixation abnormality of the transistor group 28*a* can be detected distinctly from each other before the start of the engine 1.

It is preferable to perform the processing of FIG. 16 when the vehicle running speed is higher than zero since the operation sound of the motor 17 can be made less noticeable.

First Modification

In the above-described embodiments, the abnormality of the ICR relay 27 or the transistor group 28*a* is detected based on the battery voltage VB, which is the voltage of the power supply line upstream of the ICR relay 27 or the transistor group 28*a*. Alternatively, for example, the abnormality of the ICR relay 27 or the transistor group 28*a* may be detected based on a voltage Vx of the power supply line between the ICR relay 27 or the transistor group 28*a* and the electromagnetic switch 19.

Following explanation will be given by using the first embodiment as an example. The current flowing through the motor 17 differs between the case where the ICR relay 27 is on the resistor side and the case where the ICR relay 27 is on the contact side. Therefore, a difference arises also in the voltage Vx. A range of the voltage Vx in the case where the ICR relay 27 is switched to the resistor side and the motor 17 is energized may be defined as a range H1. A range of the voltage Vx in the case where the ICR relay 27 is switched to the contact side and the motor 17 is energized may be defined as a range H2. In this case, the voltage Vx may be monitored and it may be determined that the resistor side fixation abnormality has occurred in the ICR relay 27 if it is determined that the voltage Vx is outside the range H2 or the voltage Vx is inside the range H1 in S340 of FIG. 7. In addition, the voltage Vx may be monitored and it may be determined that the contact side fixation abnormality has occurred in the ICR relay 27 if it is determined that the voltage Vx is outside the range H1 or the voltage Vx is inside the range H2 in S400 of FIG. 7 and S140 of FIG. 6 respectively. Such the modification can be applied also to the abnormality detection of the transistor group 28*a* in a similar way.

Second Modification

In the above-described embodiments, the abnormality is detected based on the value of the voltage. Alternatively, the abnormality may be detected by using change speed of the voltage.

Next, a second modification will be explained as a modification of the first embodiment. As shown in FIG. 4, the change speed (speed of fall in this case) of the battery voltage (shown by chained line) in the case where the ICR relay 27 is switched to the resistor side and the motor 17 is energized is lower than the change speed of the battery voltage (shown by solid line) in the case where the ICR relay 27 is switched to the contact side and the motor 17 is energized.

Therefore, a threshold value (of change speed of voltage) for the abnormality detection of the ICR relay 27 is set at a value larger than change speed, which is anticipated when the ICR relay 27 is on the resistor side, and smaller than change speed, which is anticipated when the ICR relay 27 is on the contact side. That is, the threshold value is set between the change speed in the case of the resistor side and the change speed in the case of the contact side.

In S140 of FIG. 6 as the diagnostic processing at engine start, the change speed (speed of fall) of the monitor voltage Vm since the energization to the motor 17 is started until the monitor voltage Vm reaches the minimum peak is sensed. The sensed change speed is compared with the above-described threshold value. If the change speed of the monitor voltage Vm is equal to or higher than the threshold value, it is determined that the contact side fixation abnormality has occurred in the ICR relay 27.

Other Modifications

Figure 17:
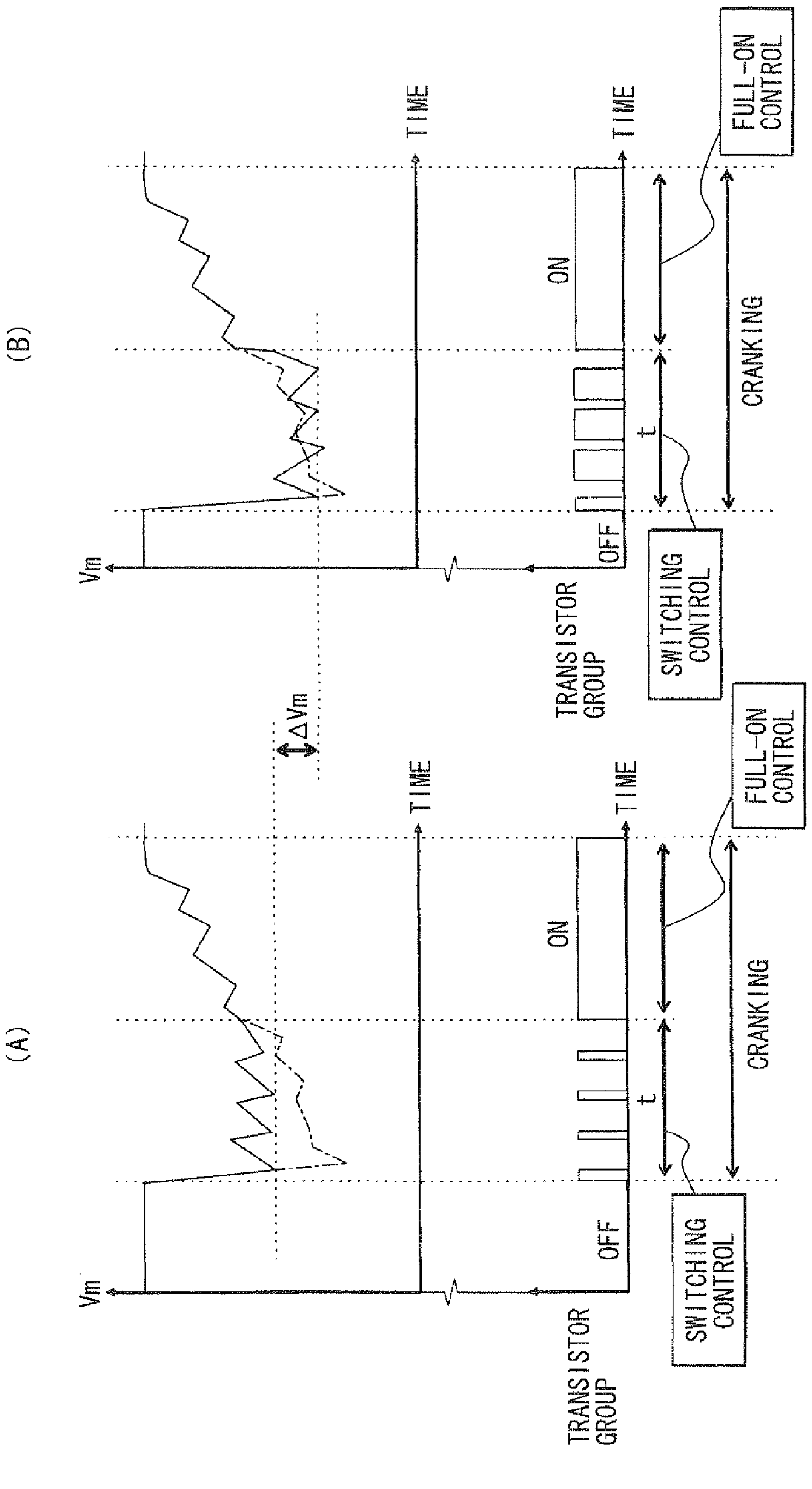
FIG. 17 is a diagram illustrating control of a suppression amount of inrush current according to a modification of the fifth embodiment.

In the case where the current to the motor 17 during the cranking is suppressed by the switching control of the transistor group 28*a* as in the fifth embodiment, the degree of the suppression of the current to the motor 17 (i.e., current suppression amount) can be changed by changing a duty ratio of the switching control as shown in FIG. 17. In this example, the duty ratio is a ratio of an on-state time to a single cycle time, which is the sum of the on-state time and an off-state time.

Part (A) of FIG. 17 shows an example of increasing the suppression amount of the inrush current to the motor 17 and further suppressing the fall of the battery voltage by decreasing the duty ratio during an inrush current suppression period, in which the switching control of the transistor group 28*a* is performed. Part (B) of FIG. 17 shows an example of decreasing the suppression amount of the inrush current to the motor 17 by increasing the duty ratio during the inrush current suppression period. A chained line in each of parts (A) and (B) of FIG. 17 shows a voltage waveform in the case where the full-on control of the transistor group 28*a* is performed from the beginning of the energization to the motor 17 like the chained line in FIG. 12. ΔVm in FIG. 17 indicates a difference in the voltage drop caused by the inrush current.

The full-on control of the transistor group 28*a* according to the above embodiments may include control for almost keeping the transistor group 28*a* in the on-state. That is, the duty ratio for the full-on control is not limited to 100%. Alternatively, the full-on control may be performed by setting the duty ratio at a value close to 100%.

Further, adjustment according to a charged state (i.e., charge amount) of the battery 15 may be performed to further suppress the fall of the battery voltage by increasing the suppression amount of the inrush current (i.e., by decreasing duty ratio) when the charge amount is small or to improve startability of the engine 1 by decreasing the suppression amount of the inrush current when the charge amount is large, for example.

The present invention is not limited to the above-described embodiments and modifications. Furthermore, the present invention can be modified and implemented as follows, for example.

For example, the electromagnetic switch 19 may be driven directly, not via the relay 31. Likewise, the pinion actuation solenoid 23 may be driven directly, not via the relay 33.

The ICR relay 27 may be structured to be switched to the contact side (such that contacts 27*b*, 27*c* short-circuit) when the coil 27*a* is energized. The ICR relay 27 may be arranged in the power supply line between the electromagnetic switch 19 and the motor 17.

In the first embodiment, the determination value VthiR used in S340 of FIG. 7 and the determination value VthiP used in S400 of FIG. 7 may be set at different values.

The diagnostic processing during engine operation of FIGS. 7, 15 and 16 may be suspended based on a circumference environment of the vehicle (e.g., whether vehicle is in residential area or not, whether noise level is high or not) or time (night or day).

If the vehicle mounted with the ECU 11 is a vehicle having an idle stop control section for performing automatic stop and automatic restart (i.e., idle reduction) of the engine 1, the ECU 11 (or more specifically, microcomputer 41 of ECU 11) can be constructed such that the ECU 11 (or microcomputer 41) performs the same processing as the diagnostic processing at start timing (shown in FIG. 6 or 14) also in the automatic restart of the engine 1 and performs the same processing as the diagnostic processing during engine operation (shown in FIG. 7, 15 or 16) during the idle stop (i.e., during automatic stop of engine 1). The above-mentioned idle stop control section is a section for automatically stopping the engine 1 when a predetermined stop condition is satisfied and for automatically restarting the engine 1 when a predetermined automatic start condition is satisfied thereafter.

In the case where the vehicle has the above-mentioned idle stop control section, for example, the ECU 11 according to the first embodiment can be constructed to prohibit the execution of the idle stop (i.e., automatic stop of engine 1) when either the contact side fixation abnormality or the resistor side fixation abnormality of the ICR relay 27 is detected. With such the construction, when the constant side fixation abnormality of the ICR relay 27 occurs, the problem that the inrush current to the motor 17 cannot be suppressed in the automatic restart of the engine 1 and the battery voltage VB falls can be precluded. When the resistor side fixation abnormality of the ICR relay 27 occurs, the problem that the burning out of the resistor 27*d* of the ICR relay 27 in the automatic restart of the engine 1 can be precluded.

Likewise, the ECU 11 according to the fifth embodiment can be configured to prohibit the execution of the idle stop when any fixation abnormality of the transistor group 28*a* is detected. With such the configuration, when the on-state fixation abnormality of the transistor group 28*a* occurs, the problem that the inrush current to the motor 17 cannot be suppressed in the automatic restart of the engine 1 and the battery voltage VB falls can be precluded. When the off-state fixation abnormality of the transistor group 28*a* occurs, the problem that the idle stop is performed and the engine 1 cannot be restarted can be precluded.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A starter controller used for a vehicle having:

a starter that cranks an engine of the vehicle by torque of a motor;

switching means that is provided in a power supply line from a power supply to the motor of the starter and that is selectively driven between an on-state for connecting the power supply line and an off-state for disconnecting the power supply line; and inrush current suppressing means that is provided in series with the switching means in the power supply line and that is driven between a first state for suppressing a current passed to the motor and a second state for not suppressing the current passed to the motor when the switching means is driven to the on-state, the starter controller comprising:

start energization processing means for performing start energization processing for driving the inrush current suppressing means to the first state, for driving the switching means to the on-state, and for driving the inrush current suppressing means from the first state to the second state after elapse of a predetermined time as energization processing for energizing the motor such that the starter cranks the engine when the engine is started in response to starting operation by a driver of the vehicle; and abnormality detecting means for detecting whether an uncontrollable abnormality has occurred in the inrush current suppressing means based on a voltage of the power supply line at the time when the switching means is driven to the on-state.

2. The starter controller as in claim 1, wherein the inrush current suppressing means is selectively driven between the first state where a resistor is inserted into the power supply line in series and the second state where the resistor is not inserted into the power supply line.

3. The starter controller as in claim 2, wherein the abnormality detecting means detects whether a fixation abnormality, in which the inrush current suppressing means cannot switch the state, has occurred in the inrush current suppressing means based on an output voltage of the power supply at the time when the switching means is driven to the on-state.

4. The starter controller as in claim 3, wherein the abnormality detecting means determines whether the output voltage of the power supply becomes lower than a predetermined determination value of second state fixation when the inrush current suppressing means is driven to the first state and the switching means is driven to the on-state, and the abnormality detecting means determines that a fixation abnormality, in which the inrush current suppressing means remains in the second state, has occurred in the inrush current suppressing means if the output voltage becomes lower than the determination value of second state fixation.

5. The starter controller as in claim 4, wherein the starter has a pinion gear that is rotated by the motor and that cranks the engine when the pinion gear is rotated in a state where the pinion gear is engaged with a ring gear of the engine, the starter is constructed to be switchable between a state where the pinion gear is engaged with the ring gear and a state where the pinion gear is disengaged from the ring gear regardless of whether the motor is energized or not, and the abnormality detecting means performs second state fixation abnormality detection processing at non-start timing for disengaging the pinion gear from the ring gear, for driving the inrush current suppressing means to the first state, for driving the switching means to the on-state, for determining whether the output voltage of the power supply at that time becomes lower than a first determination value of second state fixation, and for determining that the fixation abnormality, in which the inrush current suppressing means remains in the second state, has occurred in the inrush current suppressing means if the output voltage becomes lower than the first determination value of second state fixation as processing for detecting whether the fixation abnormality, in which the inrush current suppressing means remains in the second state, has occurred in the inrush current suppressing means during operation of the engine.

6. The starter controller as in claim 4, wherein the abnormality detecting means performs second state fixation abnormality detection processing at start timing for determining whether the output voltage of the power supply becomes lower than a second determination value of second state fixation and for determining that the fixation abnormality, in which the inrush current suppressing means remains in the second state, has occurred in the inrush current suppressing means if the output voltage becomes lower than the second determination value of second state fixation as processing for detecting whether the fixation abnormality, in which the inrush current suppressing means remains in the second state, has occurred in the inrush current suppressing means when the starter controller performs the start energization processing to drive the inrush current suppressing means to the first state and to drive the switching means to the on-state.

7. The starter controller as in claim 4, further comprising:

first informing means for informing the vehicle driver of the occurrence of the fixation abnormality, in which the inrush current suppressing means remains in the second state, when the abnormality detecting means determines that the fixation abnormality, in which the inrush current suppressing means remains in the second state, has occurred in the inrush current suppressing means.

8. The starter controller as in claim 3, wherein the abnormality detecting means determines whether the output voltage of the power supply becomes lower than a predetermined determination value of first state fixation when the inrush current suppressing means is driven to the second state and the switching means is driven to the on-state, and the abnormality detecting means determines that a fixation abnormality, in which the inrush current suppressing means remains in the first state, has occurred in the inrush current suppressing means if the output voltage does not become lower than the determination value of first state fixation.

9. The starter controller as in claim 8, wherein the starter has a pinion gear that is rotated by the motor and that cranks the engine when the pinion gear is rotated in a state where the pinion gear is engaged with a ring gear of the engine, the starter is constructed to be switchable between a state where the pinion gear is engaged with the ring gear and a state where the pinion gear is disengaged from the ring gear regardless of whether the motor is energized or not, and the abnormality detecting means performs first state fixation abnormality detection processing at non-start timing for disengaging the pinion gear from the ring gear, for driving the inrush current suppressing means to the second state, for driving the switching means to the on-state, for determining whether the output voltage of the power supply at that time becomes lower than the determination value of first state fixation, and for determining that the fixation abnormality, in which the inrush current suppressing means remains in the first state, has occurred in the inrush current suppressing means if the output voltage does not become lower than the determination value of first state fixation as processing for detecting whether the fixation abnormality, in which the inrush current suppressing means remains in the first state, has occurred in the inrush current suppressing means during the operation of the engine.

10. The starter controller as in claim 9, wherein the starter controller is configured to limit an energization time of the motor by the start energization processing to a predetermined limit time when the abnormality detecting means determines that the fixation abnormality, in which the inrush current suppressing means remains in the first state, has occurred in the inrush current suppressing means.

11. The starter controller as in claim 8, further comprising: second informing means for informing the vehicle driver of the occurrence of the fixation abnormality, in which the inrush current suppressing means remains in the first state, when the abnormality detecting means determines that the fixation abnormality, in which the inrush current suppressing means remains in the first state, has occurred.

12. The starter controller as in claim 5, wherein the starter controller is configured to engage the pinion gear with the ring gear when the motor is energized by the start energization processing, the abnormality detecting means performs second state fixation abnormality detection processing at start timing for determining whether the output voltage of the power supply becomes lower than a second determination value of second state fixation and for determining that the fixation abnormality, in which the inrush current suppressing means remains in the second state, has occurred in the inrush current suppressing means if the output voltage becomes lower than the second determination value of second state fixation as processing for detecting whether the fixation abnormality, in which the inrush current suppressing means remains in the second state, has occurred in the inrush current suppressing means when the starter controller performs the start energization processing to drive the inrush current suppressing means to the first state and to drive the switching means to the on-state, and the second determination value of second state fixation is set at a value smaller than the first determination value of second state fixation.

13. The starter controller as in claim 5, wherein the abnormality detecting means performs the second state fixation abnormality detection processing at non-start timing when running speed of the vehicle is higher than zero.

14. The starter controller as in claim 9, wherein the abnormality detecting means performs the first state fixation abnormality detection processing at non-start timing when running speed of the vehicle is higher than zero.

15. The starter controller as in claim 1, wherein the inrush current suppressing means is a switching element that is provided to the power supply line and constructed such that the switching element is driven to the first state when drive of switching control for alternately switching the switching element between an on-state and an off-state is performed and is driven to the second state when drive for continuing the on-state of the switching element is performed.

16. The starter controller as in claim 15, wherein the abnormality detecting means detects whether the uncontrollable abnormality has occurred in the inrush current suppressing means based on the output voltage of the power supply at the time when the switching means is driven to the on-state.

17. The starter controller as in claim 16, wherein the abnormality detecting means determines whether the output voltage of the power supply becomes lower than a predetermined determination value of on-state fixation when the inrush current suppressing means is driven to the first state or the off-state and the switching means is driven to the on-state, and the abnormality detecting means determines that the fixation abnormality, in which the inrush current suppressing means remains in the on-state, has occurred in the inrush current suppressing means if the output voltage becomes lower than the determination value of on-state fixation.

18. The starter controller as in claim 17, wherein the starter has a pinion gear that is rotated by the motor and that cranks the engine when the pinion gear is rotated in a state where the pinion gear is engaged with a ring gear of the engine, the starter is constructed to be switchable between a state where the pinion gear is engaged with the ring gear and a state where the pinion gear is disengaged from the ring gear regardless of whether the motor is energized or not, and the abnormality detecting means performs on-state fixation abnormality detection processing at non-start timing for disengaging the pinion gear from the ring gear, for driving the inrush current suppressing means to the first state or the off-state, for driving the switching means to the on-state, for determining whether the output voltage of the power supply at that time becomes lower than a first determination value of on-state fixation, and for determining that the fixation abnormality, in which the inrush current suppressing means remains in the on-state, has occurred in the inrush current suppressing means if the output voltage becomes lower than the first determination value of on-state fixation as processing for detecting whether the fixation abnormality, in which the inrush current suppressing means remains in the on-state, has occurred in the inrush current suppressing means during the operation of the engine.

19. The starter controller as in claim 17, wherein the abnormality detecting means performs on-state fixation abnormality detection processing at start timing for determining whether the output voltage of the power supply becomes lower than a second determination value of on-state fixation and for determining that the fixation abnormality, in which the inrush current suppressing means remains in the on-state, has occurred in the inrush current suppressing means if the output voltage becomes lower than the second determination value of on-state fixation as processing for detecting whether the fixation abnormality, in which the inrush current suppressing means remains in the on-state, has occurred in the inrush current suppressing means when the starter controller performs the start energization processing to drive the inrush current suppressing means to the first state and to drive the switching means to the on-state.

20. The starter controller as in claim 17, further comprising:

first informing means for informing the vehicle driver of the occurrence of the fixation abnormality, in which the inrush current suppressing means remains in the on-state, when the abnormality detecting means determines that the fixation abnormality, in which the inrush current suppressing means remains in the on-state, has occurred in the inrush current suppressing means.

21. The starter controller as in claim 16, wherein the abnormality detecting means determines whether the output voltage of the power supply becomes lower than a predetermined determination value of off-state fixation when the inrush current suppressing means is driven to the second state and the switching means is driven to the on-state, and the abnormality detecting means determines that the fixation abnormality, in which the inrush current suppressing means remains in the off-state, has occurred in the inrush current suppressing means if the output voltage does not become lower than the determination value of off-state fixation.

22. The starter controller as in claim 21, wherein the starter has a pinion gear that is rotated by the motor and that cranks the engine when the pinion gear is rotated in a state where the pinion gear is engaged with a ring gear of the engine, the starter is constructed to be switchable between a state where the pinion gear is engaged with the ring gear and a state where the pinion gear is disengaged from the ring gear regardless of whether the motor is energized or not, and the abnormality detecting means performs off-state fixation abnormality detection processing at non-start timing for disengaging the pinion gear from the ring gear, for driving the inrush current suppressing means to the second state, for driving the switching means to the on-state, for determining whether the output voltage of the power supply at that time becomes lower than the determination value of off-state fixation, and for determining that the fixation abnormality, in which the inrush current suppressing means remains in the off-state, has occurred in the inrush current suppressing means if the output voltage does not become lower than the determination value of off-state fixation as processing for detecting whether the fixation abnormality, in which the inrush current suppressing means remains in the off-state, has occurred in the inrush current suppressing means during the operation of the engine.

23. The starter controller as in claim 21, further comprising:

second informing means for informing the vehicle driver of the occurrence of the fixation abnormality, in which the inrush current suppressing means remains in the off-state, when the abnormality detecting means determines that the fixation abnormality, in which the inrush current suppressing means remains in the off-state, has occurred.

24. The starter controller as in claim 18, wherein the starter controller is configured to engage the pinion gear with the ring gear when the motor is energized by the start energization processing, the abnormality detecting means performs on-state fixation abnormality detection processing at start timing for determining whether the output voltage of the power supply becomes lower than a second determination value of on-state fixation and for determining that the fixation abnormality, in which the inrush current suppressing means remains in the on-state, has occurred in the inrush current suppressing means if the output voltage becomes lower than the second determination value of on-state fixation as processing for detecting whether the fixation abnormality, in which the inrush current suppressing means remains in the on-state, has occurred in the inrush current suppressing means when the starter controller performs the start energization processing to drive the inrush current suppressing means to the first state and to drive the switching means to the on-state, and the second determination value of on-state fixation is set at a value smaller than the first determination value of on-state fixation.

25. The starter controller as in claim 18, wherein the abnormality detecting means performs the on-state fixation abnormality detection processing at non-start timing when running speed of the vehicle is higher than zero.

26. The starter controller as in claim 22, wherein the abnormality detecting means performs the off-state fixation abnormality detection processing at non-start timing when running speed of the vehicle is higher than zero.

27. The starter controller as in claim 16, wherein the abnormality detecting means monitors the output voltage of the power supply when the starter controller performs the start energization processing to drive the inrush current suppressing means to the first state and to drive the switching means to the on-state, the abnormality detecting means determines that the fixation abnormality, in which the inrush current suppressing means remains in the on-state, has occurred in the inrush current suppressing means if the output voltage becomes lower than a predetermined determination value of on-state fixation, and the abnormality detecting means determines that the fixation abnormality, in which the inrush current suppressing means remains in the off-state, has occurred in the inrush current suppressing means if the output voltage does not become lower than a determination value of off-state fixation higher than the determination value of on-state fixation.

28. The starter controller as in claim 16, wherein the starter has a pinion gear that is rotated by the motor and that cranks the engine when the pinion gear is rotated in a state where the pinion gear is engaged with a ring gear of the engine, the starter is constructed to be switchable between a state where the pinion gear is engaged with the ring gear and a state where the pinion gear is disengaged from the ring gear regardless of whether the motor is energized or not, the abnormality detecting means disengages the pinion gear from the ring gear, drives the inrush current suppressing means to the first state, drives the switching means to the on-state, and monitors the output voltage of the power supply at that time during the operation of the engine, the abnormality detecting means determines that the fixation abnormality, in which the inrush current suppressing means remains in the on-state, has occurred in the inrush current suppressing means if the output voltage becomes lower than a predetermined determination value of on-state fixation, and the abnormality detecting means determines that the fixation abnormality, in which the inrush current suppressing means remains in the off-state, has occurred in the inrush current suppressing means if the output voltage does not become lower than a determination value of off-state fixation higher than the determination value of on-state fixation.

29. The starter controller as in claim 3, wherein the abnormality detecting means senses change speed of the output voltage at the time when the starter controller performs the start energization processing to drive the inrush current suppressing means to the first state and to drive the switching means to the on-state, and the abnormality detecting means determines that the fixation abnormality, in which the inrush current suppressing means remains in the second state, has occurred in the inrush current suppressing means if the change speed is equal to or higher than a predetermined value.

* * * * *